(12) United States Patent
Imaizumi

(10) Patent No.: US 6,891,885 B2
(45) Date of Patent: May 10, 2005

(54) CORRELATION CIRCUIT FOR SPREAD SPECTRUM COMMUNICATION

(75) Inventor: Ichiro Imaizumi, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 589 days.

(21) Appl. No.: 09/966,100

(22) Filed: Oct. 1, 2001

(65) Prior Publication Data

US 2002/0141489 A1 Oct. 3, 2002

(30) Foreign Application Priority Data

Apr. 3, 2001 (JP) ........................................ 2001-104288

(51) Int. Cl.[7] ............................. H04B 1/69; H03D 1/00
(52) U.S. Cl. .................... 375/150; 375/142; 375/343
(58) Field of Search ............................... 375/130, 142, 375/150, 151, 147, 343

(56) References Cited

U.S. PATENT DOCUMENTS 6,130,906 A    10/2000  Davidovici et al. ......... 375/152
6,647,056 B1 * 11/2003  Imaizumi et al. ........... 375/150
6,678,313 B1 *  1/2004  Imaizumi et al. ........... 375/150

FOREIGN PATENT DOCUMENTS

EP        0936748 A2    8/1999
GB        2323749 A     9/1998
JP        2000-196499   7/2000

* cited by examiner

*Primary Examiner*—Temesghen Ghebretinsae
(74) *Attorney, Agent, or Firm*—Jacobson Holman PLLC

(57) ABSTRACT

There is disclosed a correlation circuit for spread spectrum communication, which can demodulate users having superposed demodulation phases and equaling or exceeding a sum of products calculation processing ability without enlarging a constitution. When a plurality of users more than a specified number exist in the same phase of the input signal from a memory, a controller controls a transfer speed of a shift of one sample in an input signal register in order to hold a sufficient time for completing calculation of a sum of products with all the plurality of users in a sum of products calculator in the correlation circuit for spread spectrum communication.

19 Claims, 10 Drawing Sheets

US 6,891,885 B2

CORRELATION CIRCUIT FOR SPREAD SPECTRUM COMMUNICATION

BACKGROUND OF THE INVENTION

1. Field of the Invention

The present invention relates to a correlation circuit for spread spectrum communication for use in a receiver on a base station side of a spread spectrum communication system in mobile communication, radio LAN, and the like, particularly to a correlation circuit for spread spectrum communication in which a demodulation processing can be performed even with respect to a large number of users superposed in the same phase without increasing a constitution, and demodulation can efficiently be performed even with users different from one another in spread ratio.

2. Description of the Related Art

Generally in a spread spectrum (SS) communication system for use in mobile communication, radio LAN, and the like, transmission data is subjected to two stages of modulations including a narrow band modulation (primary modulation) and further spread modulation (secondary modulation), and transmitted on a transmission side. On a reception side, received data is subjected to inverse spread, a state of the primary modulation is returned, and subsequently a base band signal is reproduced in a usual wave detector circuit.

Moreover, a conventional correlator for spread spectrum communication for obtaining a correlation of spectrum-spread reception signals is constituted of an inverse spread circuit, and a demodulation circuit of a code division multiple modulation wave. Concretely, in the correlator for spread spectrum communication, a sliding correlator (SC) constituted of a logic circuit is used to capture synchronization, and subsequently obtain the correlation in a detected synchronous phase.

For the sliding correlator, a one-bit correlator is used to shift a locally transmitted code string (spread codes) by each bit, and obtain a correlation with every received code string. When the correlation is obtained with respect to the number of bits for a code string length, a synchronous phase with a peak correlation is obtained, and synchronization is captured.

SUMMARY OF THE INVENTION

The present invention has been developed in consideration of the aforementioned situation, and an object thereof is to provide a correlation circuit for spread spectrum communication in which a writing speed to an input register is set to be variable in accordance with superposition of demodulation phases of a plurality of users, and a large number of users having the demodulation phases superposed upon one another can be demodulated without enlarging a constitution.

According to the present invention, there is provided a correlation circuit for spread spectrum communication for obtaining a correlation output from a spectrum-spread received signal, the circuit comprising: an A/D converter for converting the received signal to a digital signal from an analog signal and sampling the signal; a memory for storing an output from the A/D converter; an input signal register, having a variable transfer speed of a shift, for shifting and outputting the input signal from the memory at a specified speed; spread code registers, prepared for a necessary number of users, for shifting and outputting a generated spread code; a sum of products calculator for multiplying and adding the input signal outputted from the input signal register and the spread code outputted from the spread code register at a specified number of times the sampling speed; and a controller for: controlling the transfer speed of the shift of one sample in the input signal register in order to hold a sufficient time for completing calculation of a sum of products with respect to all a plurality of users in the sum of products calculator, when the plurality of users more than the specified number exist in the same phase of the input signal from the memory exceeds a specified number; subsequently controlling and setting the transfer speed to be higher than the specified speed before compensating for a delay time in one symbol, when the users less than the specified number exist in the same phase is less than the specified number; and controlling and selecting the spread code to be outputted to the sum of products calculator in accordance with the number of users in the same phase. Many users having the phases superposed upon one another can be demodulated without enlarging a circuit constitution.

According to the present invention, the correlation circuit for spread spectrum communication comprises a plurality of A/D converters, memories, input signal registers, and a selector section for selecting the output from the plurality of input signal registers. The sum of products calculator multiplies and adds the input signal selected by the selector section and the spread code outputted from the spread code register at the specified number of times the sampling speed. Therefore, even with a plurality of input signals, many users having the phases superposed upon one another can be demodulated without enlarging the circuit constitution.

According to the present invention, in the correlation circuit for spread spectrum communication, the controller controls a shift timing in each input signal register to deviate. A register for holding the input signals outputted from the input signal register at different timings is disposed instead of the selector section. The sum of products calculator multiplies and adds the input signal held by the register and the spread code outputted from the spread code register at the specified number of times the sampling speed. The correlation circuit can be realized by a register constitution instead of the selector section.

According to the present invention, there is provided a correlation circuit for spread spectrum communication for obtaining a correlation output from a spectrum-spread received signal, the circuit comprising: a plurality of A/D converters for converting the plurality of received signals to digital signals from analog signals and sampling the signals; a memory for input signals, in which a speed of an output timing is variable and which stores outputs from the plurality of A/D converters and outputs the selected input signal at the speed of a specified timing; a memory for spread codes, for storing a plurality of types of spread codes and outputting the selected spread code; a sum of products calculator for multiplying and adding the input signal selectively outputted from the memory for the input signals and the spread code selectively outputted from the memory for the spread codes at a specified number of times a sampling speed; and a controller for: controlling a timing for outputting the input signal stored in the memory for the input signals and the spread code stored in the corresponding memory for the spread codes to the sum of products calculator; controlling the speed of the output timing from the memory for the input signals in order to hold a sufficient time for completing calculation of a sum of products with respect to all a plurality of users in the sum of products calculator, when the plurality of users more than the specified number exist in the same phase of the input signal inputted to the memory for the input signals; subsequently controlling and setting the speed of the output timing from the memory for the input signals to be higher than the speed of the specified timing before compensating for a delay time within one symbol, when the users less than the specified number exist in the same phase; and controlling and selecting the spread code to be outputted to the sum of products calculator in accordance with the number of users in the same phase. Many users having the phases superposed upon one another can be demodulated without enlarging the circuit constitution.

According to the present invention, in the correlation circuit for spread spectrum communication, the input signal register has a variable writing speed of data, and successively writes and outputs the input signal from the memory at the specified speed. The spread code register is prepared for the necessary number of users, and cyclically shifts and outputs the generated spread code. The controller controls a cyclic shift in the spread code register in accordance with a writing position in the input signal register. Instead of shifting the input signal by the input signal register, the spread code is cyclically shifted, so that the power consumption in the circuit can be suppressed.

According to the present invention, in the correlation circuit for spread spectrum communication, the sum of products calculator comprises a multiplier section for multiplying the input signal and spread code, and an adder section for successively adding a multiplication result in a stepwise manner. A plurality of outputs in the course of stepwise addition in the adder section can be selectively outputted as partial correlation outputs. The controller selects the partial correlation output in the adder section in accordance with the spread ratio of the spread code, and even the different spread ratio can be handled.

According to the present invention, in the correlation circuit for spread spectrum communication, the sum of products calculator comprises a multiplier section for multiplying the input signal and spread code, and an adder section for successively adding a multiplication result in a stepwise manner. The controller resets an adder for performing stepwise addition in the adder section in accordance with the spread ratio of the spread code, and even the different spread ratio can be handled.

DESCRIPTION OF REFERENCE NUMERALS

Figure 1:
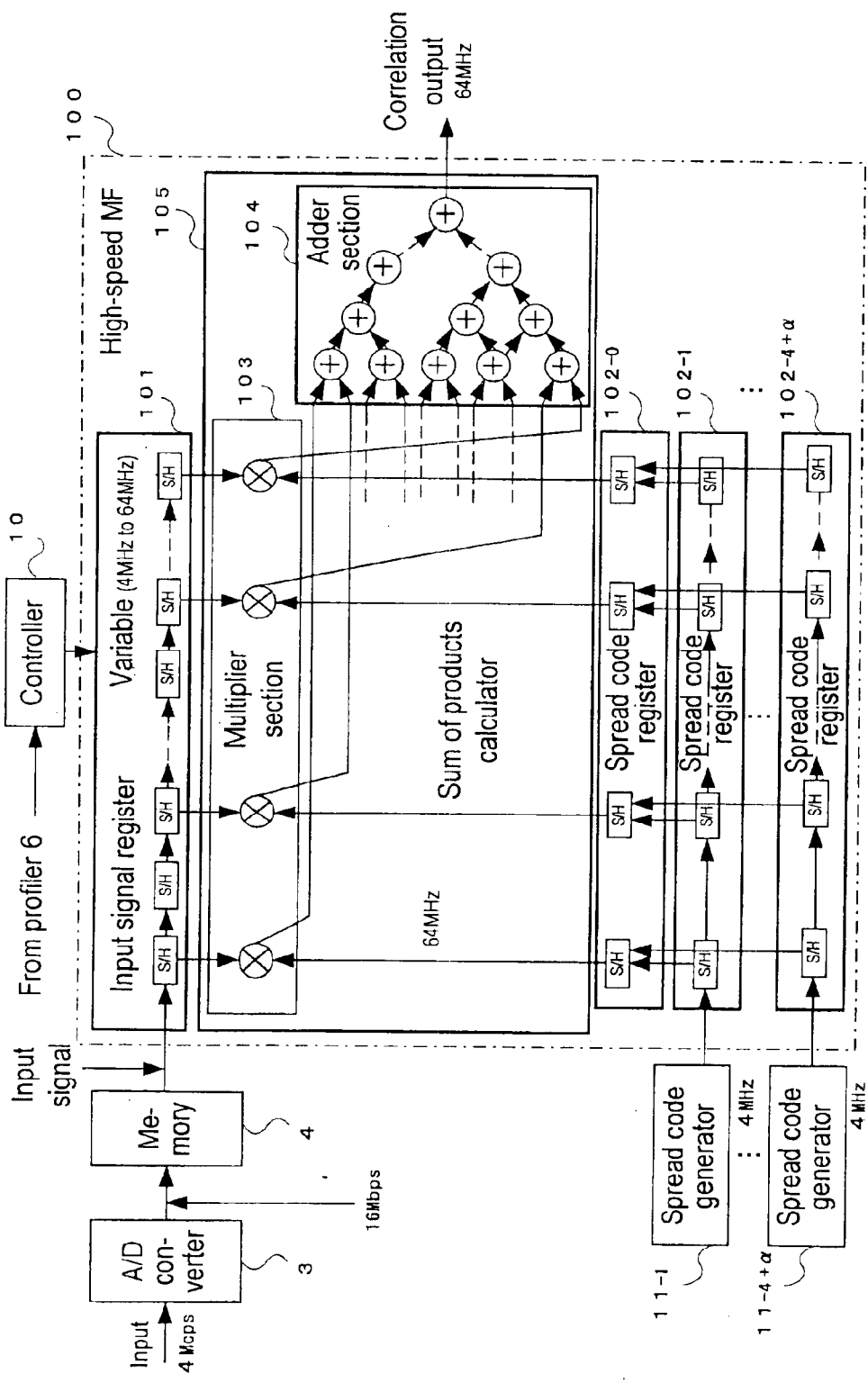
FIG. 1 is a constitution block diagram of a correlation circuit for spread spectrum communication according to a first embodiment of the present invention.

1 . . . antenna, 2 . . . RF section, 3 . . . A/D converter, 4 . . . memory, 5 . . . high-speed matched filter, 6 . . . profiler, 7 . . . finger memory, 8 . . . RAKE combiner, 9 . . . data and voice processor, 10, 10', 10" . . . controller, 11 . . . spread code generator, 100, 100' . . . high-speed matched filter, 101 . . . input signal register, 102 . . . spread code register, 103 . . . multiplier, 104 . . . adder, 105 . . . sum of products calculator, 106 . . . sum of products calculator output holder, 107 . . . adder section, 108 . . . selector section, 109 . . . input signal register, 110 . . . input signal memory, 111 . . . spread code memory, 120 . . . cyclic code register, 121 . . . cyclic code register for calculation, 122 . . . code shift register waiting for load, 130 . . . S/H circuit

DETAILED DESCRIPTION OF THE PREFERRED EMBODIMENTS

Preferred embodiments of the present invention will be described with reference to the drawings.

Additionally, function realizing means described hereinafter may be any circuit or apparatus as long as the means can realize the function, and it is also possible to realize a part or whole of the function by software. Furthermore, the function realizing means may be realized by a plurality of circuits, and a plurality of function realizing means may be realized by a single circuit.

In general, for demodulation of a W-CDMA input signal in a base station, it is necessary to satisfy two functions: a function of a searcher for detecting a phase of a received signal (including a delay wave); and a demodulation function of actually performing demodulation from the received signal with the phase detected by the searcher.

In a correlation circuit for spread spectrum communication which realizes the searcher function, there are roughly two types of signals as the received signals: a data channel signal whose phase can be predicted to some degree; and a random access channel signal whose phase can hardly be predicted. In any case, since the phase cannot be predicted, much time is required for detecting a delay wave component in a sliding correlator (SC) constitution. Moreover, when the problem is solved by increasing the number of SCs, a hardware scale is disadvantageously enlarged. Therefore, there is a demand for a constitution using a matched filter (MF).

Moreover, for the correlation circuit for spread spectrum communication which realizes the demodulation function, the phase of the signal is known (any of symbol, radio slot, frame, and also with respect to a plurality of delay waves). A sum of products with a spread code is calculated accurately to some degree from a top position of the symbol and a correlation output is obtained. When the number of received signals is small, in order to realize only the demodulation function, even the sliding correlator (SC) can realize the function.

In order to realize the two functions, an optimum constitution differs depending upon priority to be given to simplification of the constitution, or processing speed and ability. In the present invention, it is proposed that the two functions be achieved by one constitution in a time division manner.

Prior to description of the correlation circuit for spread spectrum communication of the present invention, a demodulation circuit using the correlation circuit for spread spectrum communication of the present invention will be described.

Figure 10:
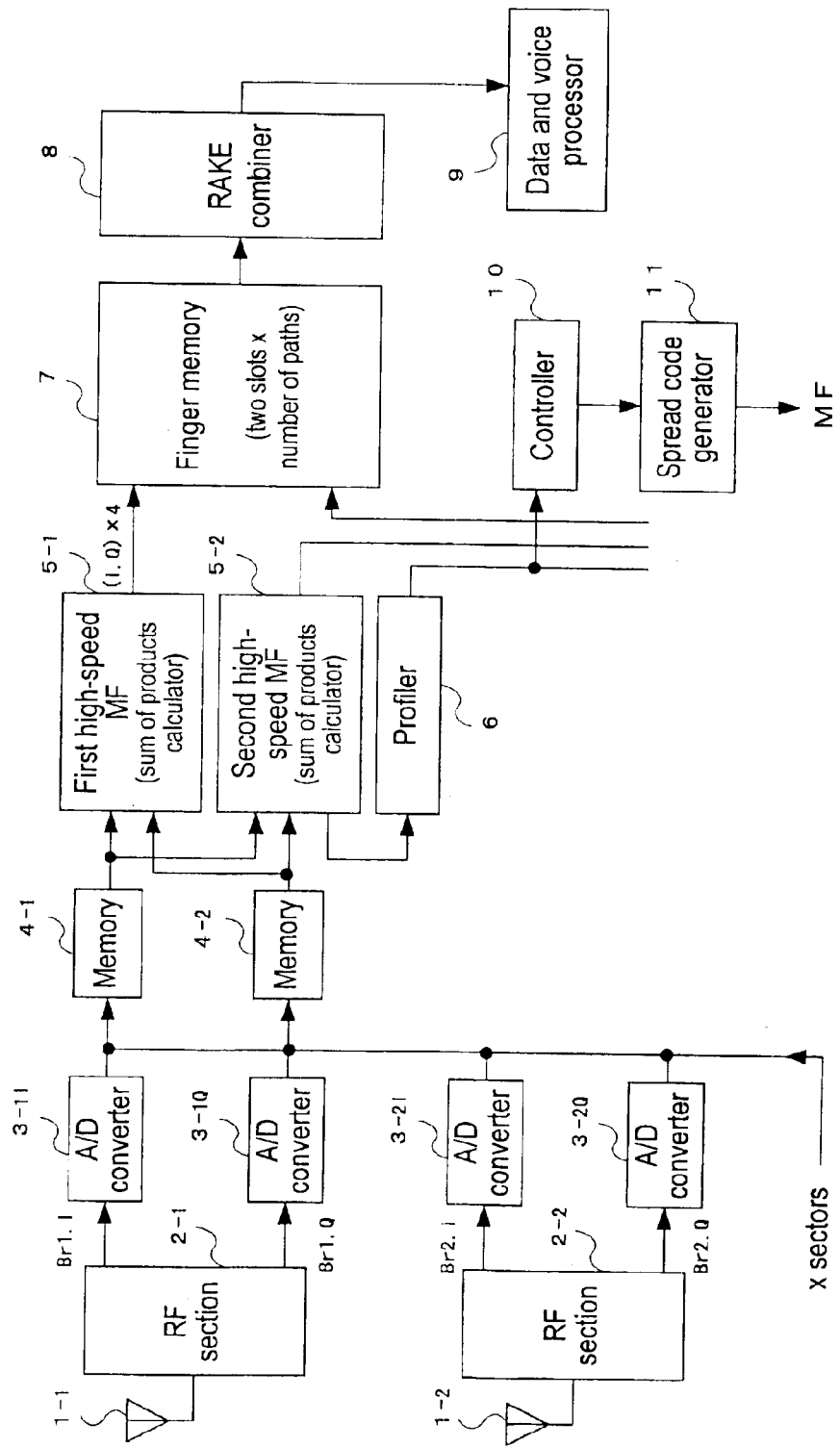
FIG. 10 is a concrete constitution block diagram of a demodulator section using a correlation circuit for spread spectrum communication.

Shown in FIG. 10, the demodulation circuit in which the correlation circuit for spread spectrum communication of the present invention is used is basically constituted of: antennas 1-1, 1-2, RF sections 2-1, 2-2, A/D converters 3-1I, 3-1Q, 3-2I, 3-2Q, memories 4-1, 4-2, high-speed matched filters (MF) 5-1, 5-2, profiler 6, finger memory 7, RAKE combiner 8, data and voice processor 9, controller 10, and spread code generator 11.

Moreover, the present invention relates to these high-speed matched filters (MF) 5-1, 5-2.

The correlation circuit for spread spectrum communication according to a first embodiment of the present invention will first be described.

According to the correlation circuit for spread spectrum communication of the first embodiment of the present invention, a calculation speed of a sum of products calculator section is high as compared with a sampling clock speed of an input signal. The matched filter operable at the high speed is used to write the input signal, which has heretofore been written and transferred to an input register at a constant speed, into the input register at a variable transfer speed in accordance with a situation of the number of users superposed upon one another in the same phase. Even when the number of users superposed upon one another in the same phase is more than the number of processable users, the users can be processed.

A concrete constitution example of the correlation circuit for spread spectrum communication according to the first embodiment of the present invention (a first correlation circuit for spread spectrum communication of the present invention) will next be described with reference to FIG. 1. FIG. 1 is a constitution block diagram of the correlation circuit for spread spectrum communication according to the first embodiment of the present invention.

As shown in FIG. 1, the first correlation circuit for spread spectrum communication of the present invention is constituted of A/D converter 3, memory 4, high-speed matched filter 100, spread code generator 11, and controller 10.

Respective components of the first correlation circuit for spread spectrum communication of the present invention will be described.

The A/D converter 3 is a high-precision analog/digital converter for converting an analog signal subjected to code division multiple access (CDMA) modulation, transmitted, and received via an antenna (not shown) to a digital signal. The number of conversion bits needs to be in a range of four to six bits, and conversion frequency is 16 MHz with four-times over-sampling in W-CDMA (wide band CDMA).

The memory 4 takes and holds at least one symbol of digital signals converted by the A/D converter 3 by a symbol unit in accordance with an instruction from a controller 10, and successively and collectively reads the signals at a high speed by the symbol unit.

The spread code generator 11 sends out the designated spread code in the designated phase in accordance with the instruction from the controller 10. In the present invention, in addition to spread code generators 11-1 to 11-4 having a standard number of processable users (number of spread codes), when the standard number of users able to be processed in the same phase (number of spread codes) increases, it is necessary to dispose the spread code generators 11 by a expandable number ($\alpha$ in FIG. 1).

The high-speed matched filter 100 takes the spectrum-spread signal stored in the memory 4 and spread code from the spread code generator 11, calculates the sum of products by one symbol unit and obtains the correlation output. The filter is different from the conventional filter in that the sum of products calculation speed is high as compared with a chip rate, and in a method of controlling a transfer speed of the input signal and control method of changing the spread code to be multiplied in the sum of products calculator.

An inner constitution of the high-speed matched filter 100 for use in the first correlation circuit for spread spectrum communication of the present invention is constituted of an input signal register 101, a plurality of spread code registers 102, and a sum of products calculator 105 including a multiplier section 103 and adder section 104.

Additionally, in the conventional input signal register, the transfer speed of the data to the S/H circuit is fixed in accordance with the input signal. On the other hand, the input signal register 101 of the present invention is different from the conventional register in that the transfer speed to the S/H circuit is variable under control from the controller 10.

Moreover, in addition to the function of the conventional controller, the controller 10 of the present invention has a function of inputting phase information of the path detected by the profiler 6, that is, detection result of a reception timing of each user, comparing the reception timings with each other to detect the number of users having the phases superposed upon one another, and controlling the data transfer speed to the input signal register and changeover of the spread code set to a spread code register 102-1.

Concretely, when the number of users having the phases superposed upon one another is more than the number of users (number of spread codes) processable in the same phase in a standard manner, the data transfer speed to the input signal register is lowered. The same sampling data (data stored in the input signal register 101) and the users (spread codes) more than the standard number of users are used to calculate the sum of products. Thereafter, to cancel an influence of reduction of the data transfer speed, when the number of users having the phases superposed upon one another is less than the number of users (number of spread codes) processable in the same phase in the standard manner, the data transfer speed to the input signal register is raised and controlled to be high.

An operation of the first correlation circuit for spread spectrum communication of the present invention will be described using concrete examples of FIGS. 10, 1, 2. FIG. 2 is an explanatory view showing the concrete example of transfer speed variation in the first correlation circuit for spread spectrum communication of the present invention. Here, since the received signal is of 4 Mcps (chips/sec), and subjected to the four-times over-sampling, the signal is inputted to the memory 4 at 16 Mbps (bits/sec). Moreover, the sum of products calculator 105 operates at 64 MHz, and four + α units of spread code generators 11 are disposed.

Concretely, in the first correlation circuit for spread spectrum communication of the present invention, the received signal of 4 Mcps (chips/sec) subjected to CDMA modulation is subjected to the four-times over-sampling in the A/D converter 3, outputted at 16 Mbps (bits/sec), and stored in the memory 4.

An operation of the first high-speed matched filter 100 for use in a searcher will first be described.

The received signal stored in the memory 4 is read from the memory 4 at a standard transfer speed of 16 MHz. The signal is shifted and stored into the high-speed matched filter 100 for the searcher, or the input signal register 101 of the high-speed matched filter 100 in which the searcher function operates. The sum of products is calculated in the sum of products calculator 105, a correlation value is outputted, the path is detected by the profiler 6, and the phase information of the detected path, that is, the detection result of the reception timing of each user is inputted to the controller 10. The controller 10 compares the reception timings with each other, and detects the number of users having the phases superposed upon one another.

Additionally, in the high-speed matched filter 100 for the searcher, the transfer speed of the input signal register as a basic of the first embodiment of the present invention does not have to be variable, and the register may operate at the standard transfer speed of 16 MHz. Therefore, the memory 4 may not be disposed in a previous stage of the high-speed matched filter 100 for the searcher.

Moreover, in the constitution of FIG. 1, the sum of products calculator 105 operates 64 MHz which is four times the sampling speed of 16 MHz, and therefore the phases for four users and the phase of delay wave can be detected. Furthermore, when the operation speed of the sum of products calculator 105 is raised, a processing of detecting the phase of the user and the phase of the delay wave can be realized.

An operation of the first high-speed matched filter 100 for use in demodulation will next be described.

With the first high-speed matched filter 100 for use in demodulation, assuming that the number of users having the phases superposed upon one another is four, by the control of the controller 10, the signal is usually set to be read from the memory 4 as it is at the standard transfer speed of 16 MHz. One symbol of received signals stored in the memory 4 is taken into the input signal register 101. First, the spread code generated by a spread code generator 11-1 is set to a spread code register 102-0 from the spread code register 102-1, and the sum of products calculator 105 calculates the sum of products at 64 MHz. Subsequently, the spread code generated by a spread code generator 11-2 is set to the spread code register 102-0 from a spread code register 102-2, and the sum of products calculator 105 performs the sum of products calculation at 64 MHz. After calculation of the sum of products of the spread codes generated by spread code generators 11-3, 11-4 are completed, respectively, the input signal register 101 takes, shifts and holds one sample of input signal.

Figure 2A:
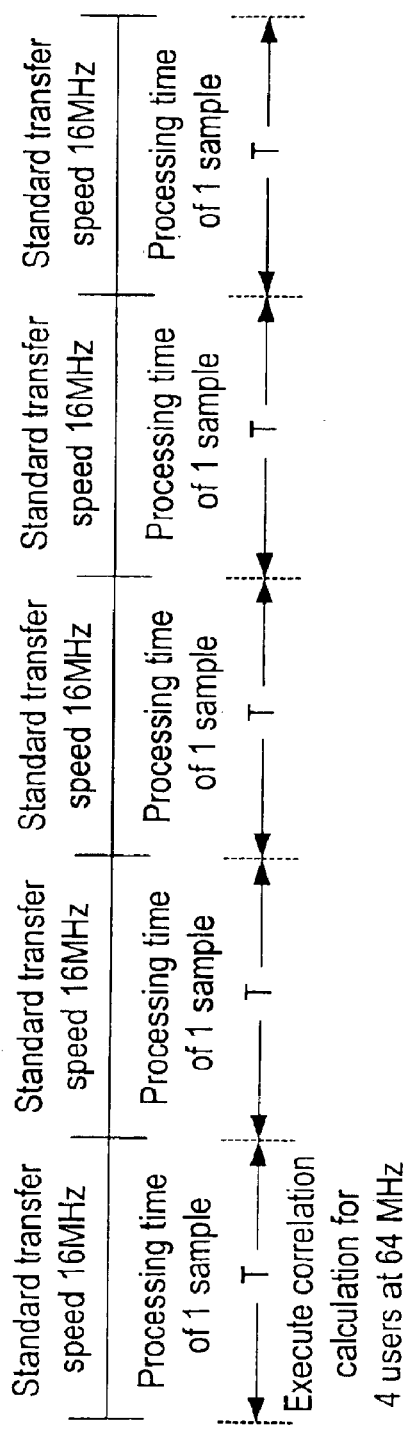
FIG. 2 is an explanatory view showing a concrete example of transfer speed variation in the first correlation circuit for spread spectrum communication according to the present invention.

As a result, as shown in FIG. 2A, the sum of products by four types of spread codes is calculated at 64 MHz during one shifting and holding in the input signal register 101 which operates at 16 MHz, and the correlation output is obtained at 64 MHz. That is, a sum of products calculation processing time with respect to the sample held in the input signal register 101 in the specified timing is T.

Moreover, when the number of users having the phases superposed upon one another, detected by the controller 10, exceeds four, for example, when a portion having the superposition for six users (six demodulation portions) is generated, the reading speed from the memory 4 is lowered, for example, to a half of the standard transfer speed, that is, 8 MHz. A time (2*T) sufficient for processing six users (acquiring six correlation portions=six demodulation portions) is provided as a time for which the users are held in the input signal register 101. Moreover, in this case, six types of spread codes to be set to the spread code register 102-0 are controlled to be switched.

Figure 2B:
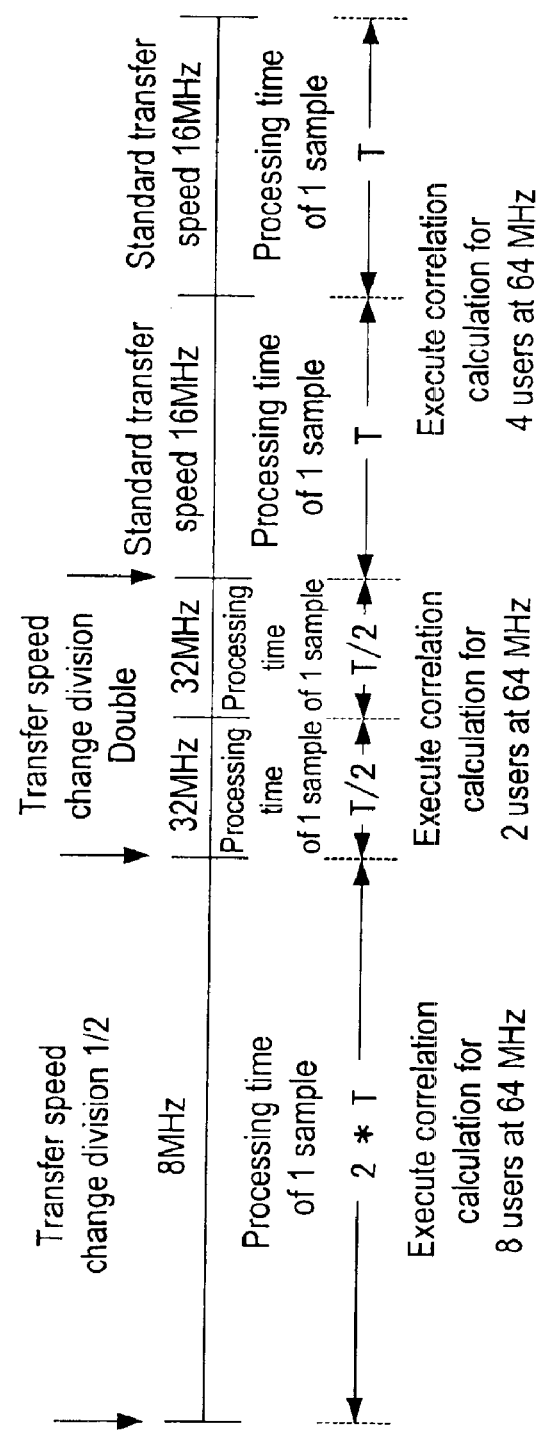

As a result, as shown in FIG. 2B, the sum of products can be calculated at 64 MHz by eight types of spread codes during one shift in the input signal register 101 operating at 8 MHz, that is, for the holding time (2*T), and the correlation outputs for eight users at maximum can be obtained at 64 MHz. That is, the sum of products calculation processing time with respect to the sample held in the input signal register 101 in the specified time is 2*T, and the signals for eight users are processed during the time. In the example, with six users, the sum of products is calculated with respect to six types of spread codes.

Additionally, when the number of superposed users is large, the transfer speed is lowered, and the processing time for one symbol is lengthened. In this case, in order to eliminate the influence, for example, when the number of users is 0 (zero) and it is unnecessary to acquire the correlation output, the reading speed (transfer speed) from the memory 4 is raised to MHz and the sample is shifted at the high speed. Moreover, when the number of superposed users is one user (demodulation of one path) or two users (demodulation of two paths), the reading speed from the memory 4 is changed to be twice the standard transfer speed of 16 MHz, that is, 32 MHz. A time (T/2) sufficient for processing two users (acquiring two correlation outputs=two demodulation portions) is provided as the holding time in the input signal register 101.

As a result, as shown in FIG. 2B, calculation of the sum of products can be performed at 64 MHz by two types of spread codes during one shift in the input signal register 101 operating at 32 MHz, that is, for the holding time (T/2), and the correlation outputs for two users at maximum can be obtained at 64 MHz. That is, the sum of products calculation processing time with respect to the sample held in the input signal register 101 in the specified time is T/2, and the signals for two users are processed during the time.

Moreover, as shown in FIG. 2B, the transfer speed is lowered so that four or more users for one shift (for one sample) can be processed. Then, to remove the influence, the transfer speed is raised, two processings are performed, and the time for one symbol is prevented from changing in total.

FIG. 2B shows that the number of the superposed users in the next timing is less than the standard number of users, but the transfer speed may be raised for any one symbol.

Additionally, in the high-speed matched filter 100 shown in FIG. 1, one symbol length is (1024)×4(64 MHz is four times 16 MHz)=4096, and with the whole processing ability, 4096 correlation outputs at maximum (for 512 users with eight paths) are acquired within one symbol time. Therefore, with the aforementioned six superposed users, even when the transfer speed is changed with slight waste in order to process eight users at maximum, the influence can sufficiently removed in another timing.

Additionally, when the data is transferred to the input signal register 101 at the standard transfer speed of 16 MHz, the memory 4 in the previous stage may write/read the data at the same 16 MHz. However, when the transfer speed changes to 8 MHz from 16 MHz, the writing speed is 16 MHz and the reading speed is 8 MHz. In this case, the writing is performed faster, and it is therefore necessary to prepare a surplus memory. Conversely, when the transfer speed changes to 64 MHz from 16 MHz, the reading is performed at 64 MHz, and the writing may be performed at 16 MHz as usual. In this case, when there is no data in the memory, the data is read at 16 MHz, and also transferred at a clock of 16 MHz. Therefore, it is necessary to determine a schedule beforehand within one symbol, and a memory capacity for securing a time necessary for scheduling is required.

The memory capacity of the memory 4 changes with a degree of generation of user superposition, but the capacity for one symbol is sufficient in a worst case.

In the correlation circuit for spread spectrum communication according to the first embodiment of the present invention, the controller 10 inputs the phase information of the path detected by the profiler 6, that is, the reception timing detection result of each user, compares the reception timings with each other, and detects the number of users having the superposed phases. When the number of detected users is more than the standard number of users, in the high-speed matched filter for realizing the demodulation function, the data transfer speed to the input signal register is slowed, the time for calculating the sum of products with the same sampling signal is lengthened, and the correlation output is obtained with respect to the number of users more than the standard number. Therefore, the transfer speed to the input signal register 101 is set to be variable and controlled in accordance with the number of users having the superposed phases without enlarging the constitution of the high-speed matched filter section, so that the correlation output can efficiently be obtained.

Moreover, in the correlation circuit for spread spectrum communication, the number of users having the superposed phases is more than the standard number of users, the data transfer speed to the input signal register is slowed, and the time for calculating the sum of products with the same sampling signal is lengthened. In this case, in a timing in which the number of users having the superposed phases is less than the standard number of users among the subsequent sampling timings, the data transfer speed to the input signal register is raised, the time for calculating the sum of products with the same sampling signal is shortened, and the correlation output is obtained with respect to the users less than the standard users. The influences of more superposed users and lowered transfer speed are canceled in the timing in which there are a smaller number of superposed users, and the processing time of one symbol is set to be the same. Therefore, the circuit can be realized without influencing the peripheral constituting elements.

Various application examples of the first embodiment will next be described.

Figure 3:
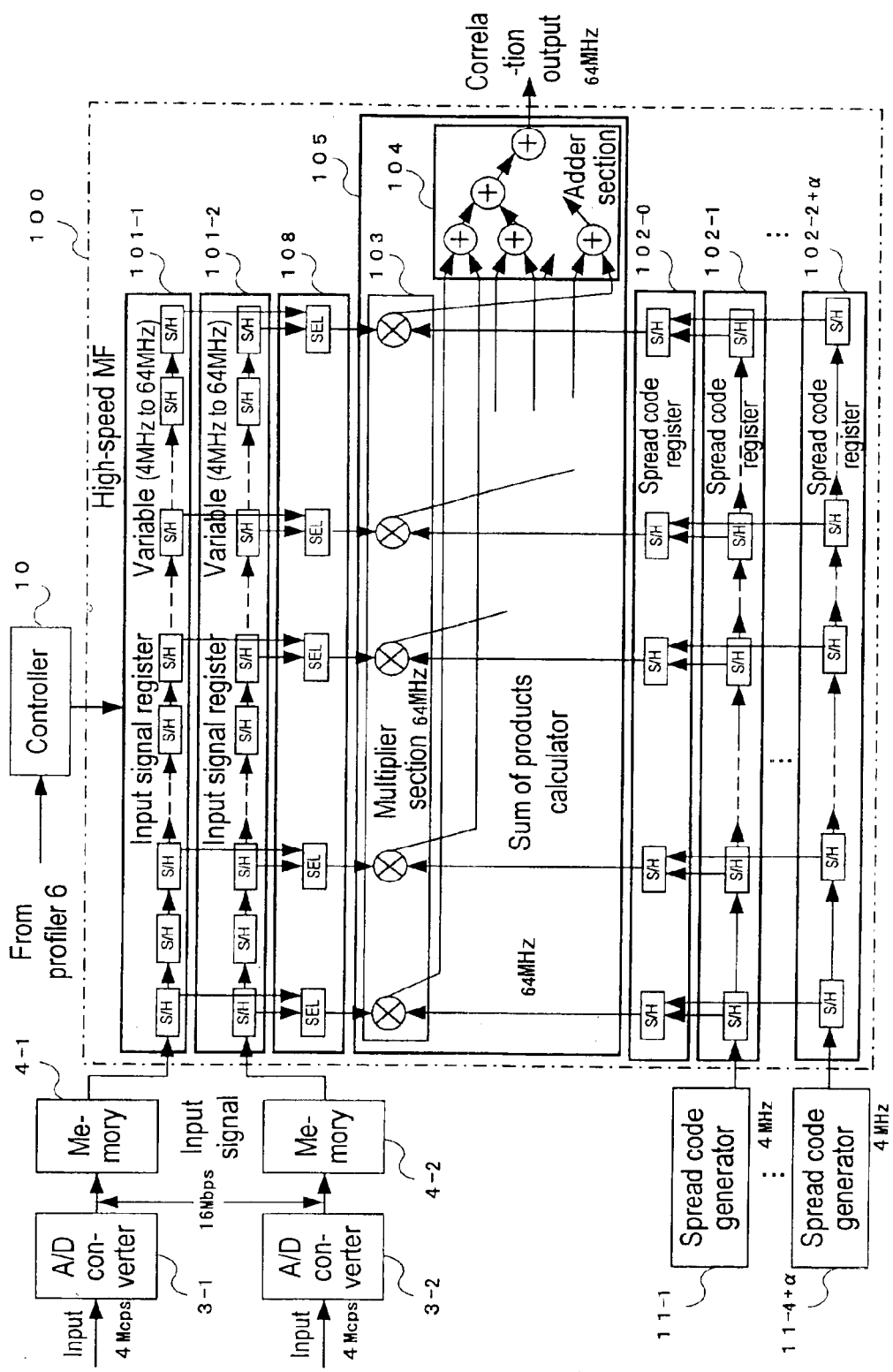
FIG. 3 is a constitution block diagram showing use of a selector section of the correlation circuit for spread spectrum communication for processing two inputs according to the first embodiment of the present invention.
Figure 4:
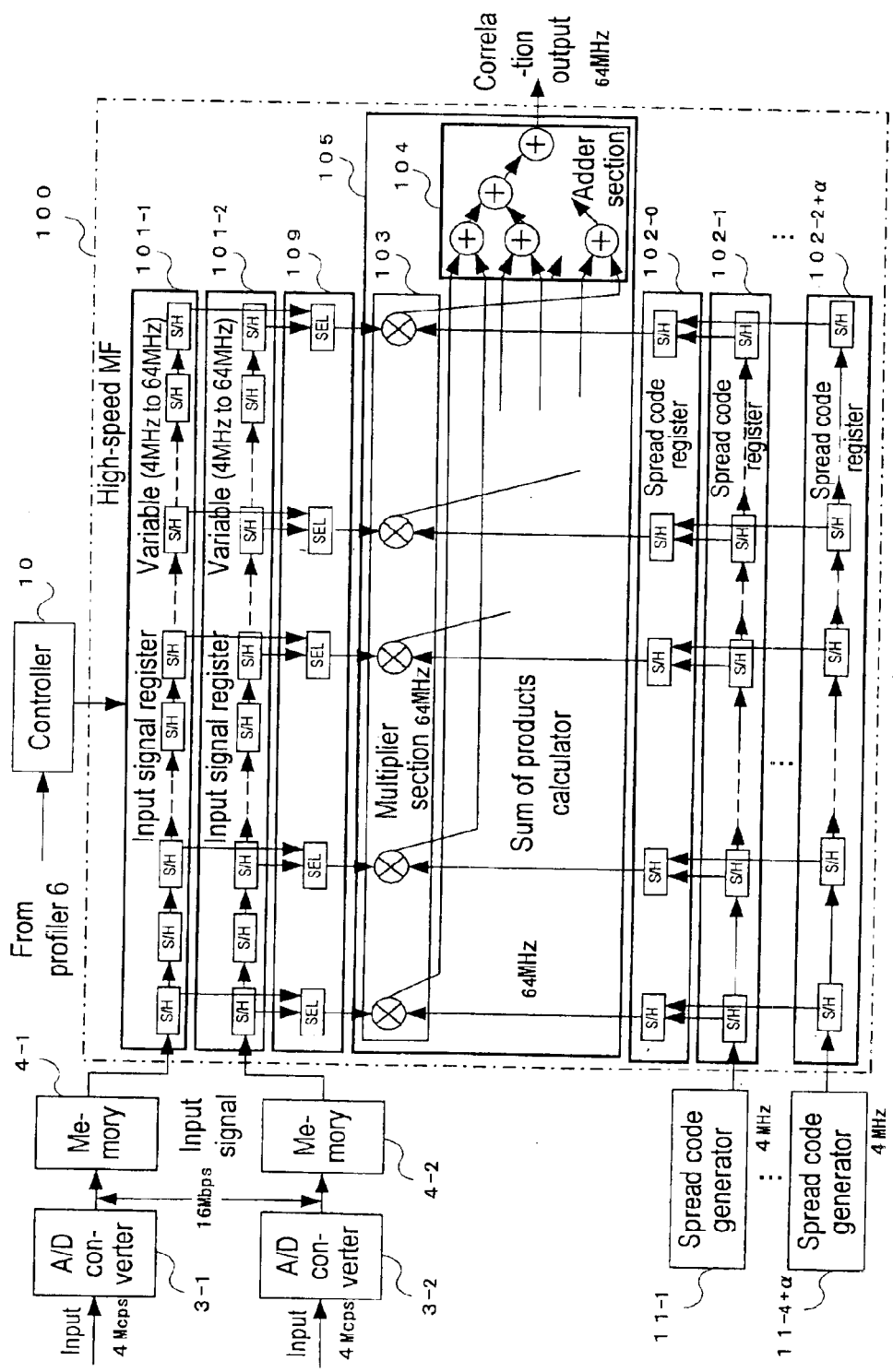
FIG. 4 is a constitution block diagram showing use of an input signal register of the correlation circuit for spread spectrum communication for processing two inputs according to the first embodiment of the present invention.

First, in the first embodiment, a second correlation circuit for spread spectrum communication will be described with reference to FIGS. 3, 4. In the second correlation circuit for spread spectrum communication of the present invention, two inputs are processed by one high-speed matched filter. FIG. 3 is a constitution block diagram showing use of a selector section of the correlation circuit for spread spectrum communication for processing two inputs according to the first embodiment of the present invention, and FIG. 4 is a constitution block diagram showing use of the input signal register of the correlation circuit for spread spectrum communication for processing two inputs according to the first embodiment of the present invention. Additionally, a constitution part similar to that of FIG. 1 will be described with the same reference numerals.

As shown in FIG. 3, the second correlation circuit for spread spectrum communication of the present invention is constituted of two A/D converters 3-1, 3-2, two memories 4-1, 4-2, high-speed matched filter 100, spread code generator 11, and controller 10.

The respective components of the second correlation circuit for spread spectrum communication of the present invention are basically similar to those of the first correlation circuit for spread spectrum communication, except that the high-speed matched filter 100 comprises a constitution for processing two inputs. Therefore, description of the components excluding the high-speed matched filter 100 is omitted.

The internal constitution of the high-speed matched filter 100 (second high-speed matched filter) for use in the second correlation circuit for spread spectrum communication of the present invention is basically constituted of the spread code register 102, and the sum of products calculator 105 including the multiplier section 103 and adder section 104 similarly as the first high-speed matched filter shown in FIG. 1. Additionally, as shown in FIG. 3, the second high-speed matched filter 100 comprises two constitutions of the input signal register 101 (first and second input signal registers 101-1, 101-2) in which the transfer speed is variable, and a selector section 108 for supplying the signals selected from the first or second input signal register 101-1, 101-2 to the sum of products calculator 105.

Moreover, as another constitution example, as shown in FIG. 4, the circuit may comprise two constitutions of the input signal register 101 having the variable transfer speed (first and second input signal registers 101-1, 101-2), and an input signal register 109 for alternately shifting/holding the data from the first or second input signal register 101-1 or 101-2 and supplying the data to the sum of products calculator 105.

In the second correlation circuit for spread spectrum communication of the present invention, it is assumed that the received signal is inputted to each A/D converter 3 at 4 Mcps (chips/sec), subjected to the four-times over-sampling in each A/D converter 3, and inputted to each memory 4 at 16 Mbps (bits/sec). It is also assumed that the sum of products calculator 105 operates at 64 MHz. Then two or more spread code generators 11 are disposed.

Moreover, in the usual operation, the received signal stored in each memory 4 is read from each memory 4 at the standard transfer speed of 16 MHz, and shifted and stored into the input signal registers 101-1 and 101-2 of the second high-speed matched filter 100.

Subsequently, first the signal of the first input signal register 101-1 is selected by the selector section 108 (FIG. 3), or outputted/held into the input signal register 109 (FIG. 4), and used to calculate the sum of products together with the spread code of the first spread code register 102 by the sum of products calculator 105, so that the correlation value is outputted. Subsequently, the signal of the second input signal register 101-2 is selected by the selector section 108 (FIG. 3), or outputted/held into the input signal register 109 (FIG. 4), and used to calculate the sum of products together with the spread code of the first spread code register 102 by the sum of products calculator 105, so that the correlation value is outputted.

Moreover, the signal of the first input signal register 101-1 is again selected by the selector section 108 (FIG. 3), or outputted/held into the input signal register 109 (FIG. 4), and used to calculate the sum of products together with the spread code of the second spread code register 102 by the sum of products calculator 105, so that the correlation value is outputted. Subsequently, the signal of the second input signal register 101-2 is selected by the selector section 108 (FIG. 3), or outputted/held into the input signal register 109 (FIG. 4), and used to calculate the sum of products together with the spread code of the second spread code register 102 by the sum of products calculator 105, so that the correlation value is outputted. The controller 10 controls the operation of the selector section 108 and spread code register 102 in this manner.

Therefore, when, as shown in FIG. 3, the received signal is subjected to the four-times over-sampling by the A/D converter 3 at 4 Mcps (chips/sec) and stored in the memory 4 at 16 Mbps (bits/sec), and the operation speed of the sum of products calculator 105 is 64 MHz, the correlation outputs of two users are obtained with respect to two inputs in the usual state.

As a most effective application example of the second high-speed matched filter 100, I component (in-phase component) and Q component (orthogonal component) obtained by orthogonal wave detection of the signal from one antenna in the demodulation section shown in FIG. 10 are used as respective inputs of FIG. 3. First, the I component (in-phase component) is used to calculate the sum of products and the correlation output is acquired. Subsequently, the Q component (orthogonal component) is used to calculate the sum of products and the correlation output is acquired. The operation is repeated with respect to two users (two spread codes), and the correlation outputs of both I, Q components of two users can be obtained in one sample time.

When the operation speed of the sum of products calculator 105 is further raised, the correlation outputs of both the I, Q components can be obtained with respect to more users.

Additionally, when one input in FIG. 3 or 4 is replaced with unrelated two inputs, four spread code generators 11 are disposed and the spread code to be multiplied may be changed.

Moreover, even in the constitution shown in FIG. 3 or 4, similarly as described in the first correlation circuit for spread spectrum communication, the controller 10 inputs the phase information of the path detected by the profiler 6, that is, the reception timing detection result of each user, compares the reception timings with each other, and detects the number of users having the superposed phases. Thereby, the controller realizes a function of controlling the data transfer speed to the input signal register from the detected number of users and the changeover of the spread code to be set to the spread code register 102-0. Then, even when the number of users having the superposed phases increases, the transfer speed to the input signal register 101 is set to be variable and controlled without enlarging the constitution of the high-speed matched filter section. Therefore, the correlation output can efficiently be obtained.

Additionally, in the constitution shown in FIGS. 3, 4, the number of input signal registers 101 is further increased, the number of taps to each selector of the selector section 108 or each S/H of the input signal register 109 is increased, and the data is selected or shifted and held in time division. Then, not only a multiprocessing of I/Q signals, but also the multiprocessing of the number of antennas can be realized by the time division processing.

Figure 5:
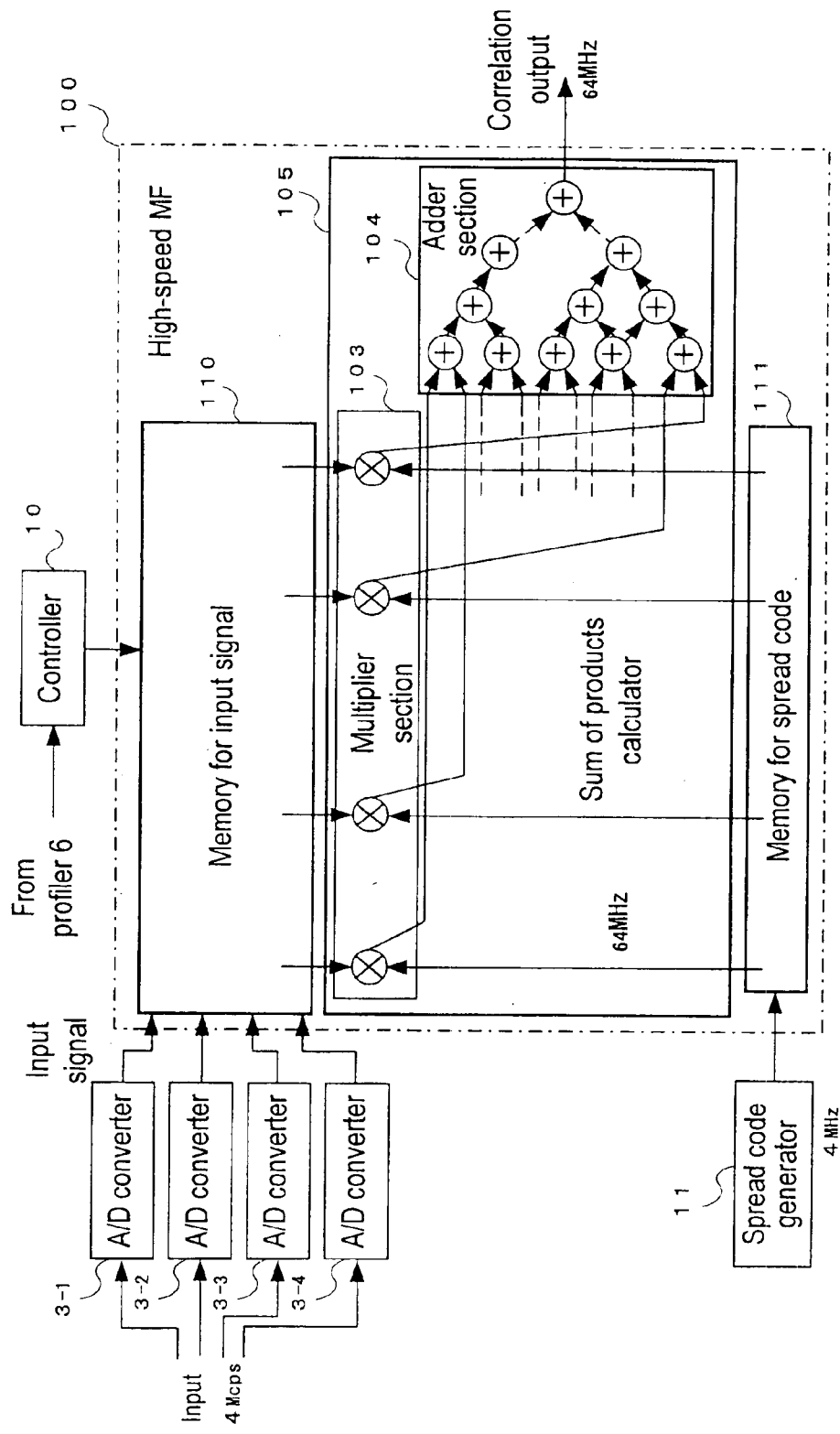
FIG. 5 is a constitution block diagram of the correlation circuit for spread spectrum communication for processing a plurality of inputs according to the first embodiment of the present invention.

As another application example of a processing of a plurality of inputs in the first embodiment, a third correlation circuit for spread spectrum communication (third correlation circuit for spread spectrum communication of the present invention) for processing a large number of inputs by one high-speed matched filter will next be described with reference to FIG. 5. FIG. 5 is a constitution block diagram of the correlation circuit for spread spectrum communication for processing the plurality of inputs according to the first embodiment of the present invention. Additionally, the constitution part similar to that of FIG. 1 will be described with the same reference numerals.

As shown in FIG. 5, the third correlation circuit for spread spectrum communication of the present invention is constituted of a plurality of (four in FIG. 5) A/D converters 3-1, 3-2, 3-3, 3-4, high-speed matched filter 100, spread code generator 11, and controller 10.

The respective components of the third correlation circuit for spread spectrum communication of the present invention are basically similar to those of the first correlation circuit for spread spectrum communication, except that the high-speed matched filter 100 comprises a constitution for processing a plurality of inputs. Therefore, description of the components excluding the high-speed matched filter 100 is omitted.

The internal constitution of the high-speed matched filter 100 (third high-speed matched filter) for use in the third correlation circuit for spread spectrum communication of the present invention is basically constituted of the sum of products calculator 105 including the multiplier section 103 and adder section 104 similarly as the first high-speed matched filter shown in FIG. 1. Additionally, as shown in FIG. 5, the third high-speed matched filter 100 comprises a memory 110 for the input signals, which also functions as the memory 4, the spread code register 102, and the selector section 108 or the input signal register 109 for a plurality of inputs, and a memory 111 for spread codes, which also functions as the plurality of spread code registers 102.

Here, the memory 110 for the input signals successively is a memory for writing/storing the signals from the respective A/D converters 3-1, 3-2, 3-3, 3-4 under the control from the controller 10, successively reading the selected signal, and outputting the signal to the sum of products calculator 105.

On the other hand, the memory 111 for the spread codes is a memory for writing/storing respective types of spread codes generated from the spread code generator 11 under the control from the controller 10, successively reading the selected spread code, and outputting the spread code to the sum of products calculator 105.

Moreover, the controller 10 controls not only the writing timing to the memory 110 for the input signals but also a writing position (address), and also controls not only the reading timing but also a reading position (address). Similarly, the controller 10 instructs the spread code generator 11 to generate the spread code, controls the writing timing and position (address) during writing of the generated spread code into the memory 111 for the spread codes, and also controls the reading timing and position (address).

In the third correlation circuit for spread spectrum communication of the present invention, it is assumed that the operation speed of the sum of products calculator 105 is high as compared with the sampling speed of the received signal. Then, a plurality of spread codes are generated by the spread code generator 11, stored in the memory 111 for the spread codes, and selected, read and outputted by the control of the controller 10. The received signal converted by each A/D converter 3 and stored in the memory 110 for the input signals is also selected, read and outputted by the control of the controller 10. Thereby, the plurality of inputs are used to calculate the sum of products with the plurality of spread codes in accordance with the calculation ability of the sum of products calculator 105, so that the correlation output can be obtained.

Moreover, as shown in FIG. 5, the memory 110 for the input signals is used instead of the input signal register 101, and the memory 111 for the spread codes is used instead of the spread code register 102. There is therefore an effect that the sum of products calculation processing can be performed in a flexibly changing control method in accordance with the number of users having the superposed phases and other situations.

Furthermore, even in the constitution shown in FIG. 5, similarly as described in the first correlation circuit for spread spectrum communication, the controller 10 inputs the phase information of the path detected by the profiler 6, that is, the reception timing detection result of each user, compares the reception timings with each other, and detects the number of users having the superposed phases. Thereby, the controller realizes a function of controlling the data reading speed from the number of detected users via the memory 110 for the input signals (data reading speed, that is, transfer speed) and the changeover of the spread code to be set to the spread code register 102-1. Then, even when the number of users having the superposed phases increases, the transfer speed to the input signal register 101 is set to be variable and controlled without enlarging the constitution of the high-speed matched filter section. Therefore, the correlation output can efficiently be obtained.

Additionally, when the memory capacity of the memory 111 for the spread codes can be set to be sufficiently large, instead of generating the spread code by the spread code generator 11, all prospective spread codes may be stored beforehand in the memory (ROM) 111 for the spread codes, and the spread code for use in demodulation may be read and outputted to the sum of products calculator 105.

When the constitution of FIG. 5 is used, and the sufficient capacity and reading speed of the memory 110 for the input signals and memory 111 for the spread codes can be secured, the input signals of a plurality of sectors, two antennas, and all I/Q components are taken, the sum of products calculator 105 operates at the high speed, and all demodulation operations can be performed by one high-speed matched filter 100.

In the correlation circuit for spread spectrum communication according to the first embodiment of the present invention, the high-speed matched filter 100 is used in which the sum of products calculator section can operate at the high calculation speed as compared with the sampling speed of the received signal. In the conventional art, the received signal is written/transferred into the input signal register 101 or read from the memory 110 for the input signals under the control of the controller 10. However, in the present circuit, the number of users having the superposed phases is detected from the phase information of the path detected by the profiler 6. When the number of users having the superposed phases is more than the number of users (number of spread codes) able to be processed with the same phase in the standard manner, the data transfer speed to the input signal register 101 or the reading speed from the memory 110 for the input signals is lowered/slowed. The sum of products with the spread code is calculated with respect all the users having the superposed phases, and the correlation output is obtained. Therefore, even when the number of users superposed in the same phases is more than the number of users processable in the standard manner, the users can effectively be processed.

Moreover, in the correlation circuit for spread spectrum communication according to the first embodiment of the present invention, when the number of users having the superposed phases (number of spread codes) is more than the number of users processable with the same phase in the standard manner, the data transfer speed to the input signal register 101 or the reading speed from the memory 110 for the input signals is lowered/slowed. Subsequently, in order to cancel the influences of the reduced data transfer speed, the data transfer speed to the input signal register 101 or the reading speed from the memory 110 for the input signals is raised in a situation (timing) in which the number of users having the superposed phases is less than the number of users (number of spread codes) processable with the same phase in the standard manner. The speed is controlled so that the time for acquiring the correlation output for one symbol does not change. Therefore, even when the transfer speed to the input signal register 101 or the reading speed from the memory 110 for the input signals is variable, the circuit can effectively be realized without influencing the other constituting elements of the demodulation section.

Moreover, in the correlation circuit for spread spectrum communication according to the first embodiment of the present invention, the number of correlation outputs for actual use in demodulation of the base station has a considerable allowance with respect to the number of correlation outputs able to be acquired at maximum in one symbol time (maximum number of acquired correlation values). Therefore, one high-speed matched filter can be used both in the demodulation and the detection of the path (searcher).

Moreover, when the filter is used in detecting the path, multi-path detection can simultaneously be performed. Furthermore, it is possible to obtain the correlation output regarding the delay wave in early, main, late (E. M. L.) states further with respect to the main path.

Furthermore, for example, a mobile phone or another mobile apparatus moves across a base station zone, and a carrier of a sector different from the carrier being used is received. Even in a compress mode generated in this situation, when the technique of the first embodiment is utilized to adjust the transfer time for the symbol, the other carrier can be received.

Additionally, in FIGS. 1, 3, 4, the spread code generator 11 is disposed for the spread code register 102. However, when the clock speed of the spread code generator 11 is set to be four times the speed, the spread codes of four different users are successively generated by one spread code generator 11, and stored in the separate input signal registers 101-1 to 101-4. Then, the circuit scale of a spread code generator 11 section can be reduced.

Moreover, for the base station, since a long code portion of the spread code is common to all the users, it is also possible to store the long code portion in a common memory (RAM, ROM). The circuit scale of the sections of the spread code generator 11 and spread code register 102 can be reduced.

In the aforementioned correlation circuit for spread spectrum communication according to the first embodiment, the operation speed of the sum of products calculator 105 is set to be high as compared with the sampling speed, and the signals of the plurality of users can be demodulated without enlarging the constitution. Here, when the operation speed of the sum of products calculator 105 is increased, the power consumption of the matched filter of the present invention increases the more. However, the number of matched filters to be disposed can be reduced as compared with the conventional constitution, and it can therefore be said that the power consumption does not increase in the whole demodulation apparatus.

Moreover, for the power consumption of the matched filter, the input signal register 101 section consumes much power (30% to 70% depending upon the constitution). This is because the S/H circuits for one symbol are disposed in the input signal register 101, and the shifting/holding operation is performed at 16 MHz.

As a countermeasure, as already known, a cyclic code register which can circulate is used in the spread code register. An operation of shifting the phase in order for the searcher, or adjusting a symbol position for demodulation is performed, while a content of the spread code register is circulated. A system is proposed in which the calculation of the sum of products is performed in this manner.

In this case, the contents of the code and input signal registers are not changed by shift for each sample clock. Every time the content of the S/H circuit is updated in order with new data for each sample clock, the content of the spread code is rotated by the cyclic code register in order to adjust a start position of the symbol before the calculation of the sum of products.

In this system, as compared with the scale of the input signal register, the spread code register is disposed at a ratio of 1/over-sampling number, each S/H circuit itself is a flip/flop (F/F) circuit of 4 to 10 bits in the input signal register, and the spread code register is of one bit. The scale of the circuit for the shift operation is remarkably reduced. Moreover, the power consumption in the input signal register is reduced to 1/tap number, that is, about $1/1000$, and can be an ignorable amount.

A second embodiment will be described. The second embodiment is constituted by applying the system in which the cyclic code register is used to the first embodiment of the present invention.

In the correlation circuit for spread spectrum communication according to the second embodiment of the present invention, the storing of the data into the input signal register 101 is not performed by the shift register. Every time the content of the S/H circuit is updated with new data in order for each sample clock, the spread code is shifted by the cyclic code register to adjust the start position of the symbol. The sum of products is calculated with respect to a plurality of spread codes by the high-speed operation of the sum of products calculator 105. The controller 10 inputs the phase information of the path detected by the profiler 6, that is, the reception timing detection result of each user, compares the reception timings with each other, and detects the number of users having the superposed phases. Thereby, the controller realizes the function of controlling a storing speed of new data for the update (data transfer speed) to the input signal register from the number of detected users and the changeover of the spread code to be set to the spread code register 102-0. Then, even when the number of users having the superposed phases increases, the transfer speed to the input signal register 101 is set to be variable and controlled without enlarging the constitution of the high-speed matched filter section. Therefore, the power consumption is largely reduced, and the correlation output can efficiently be obtained.

Figure 6:
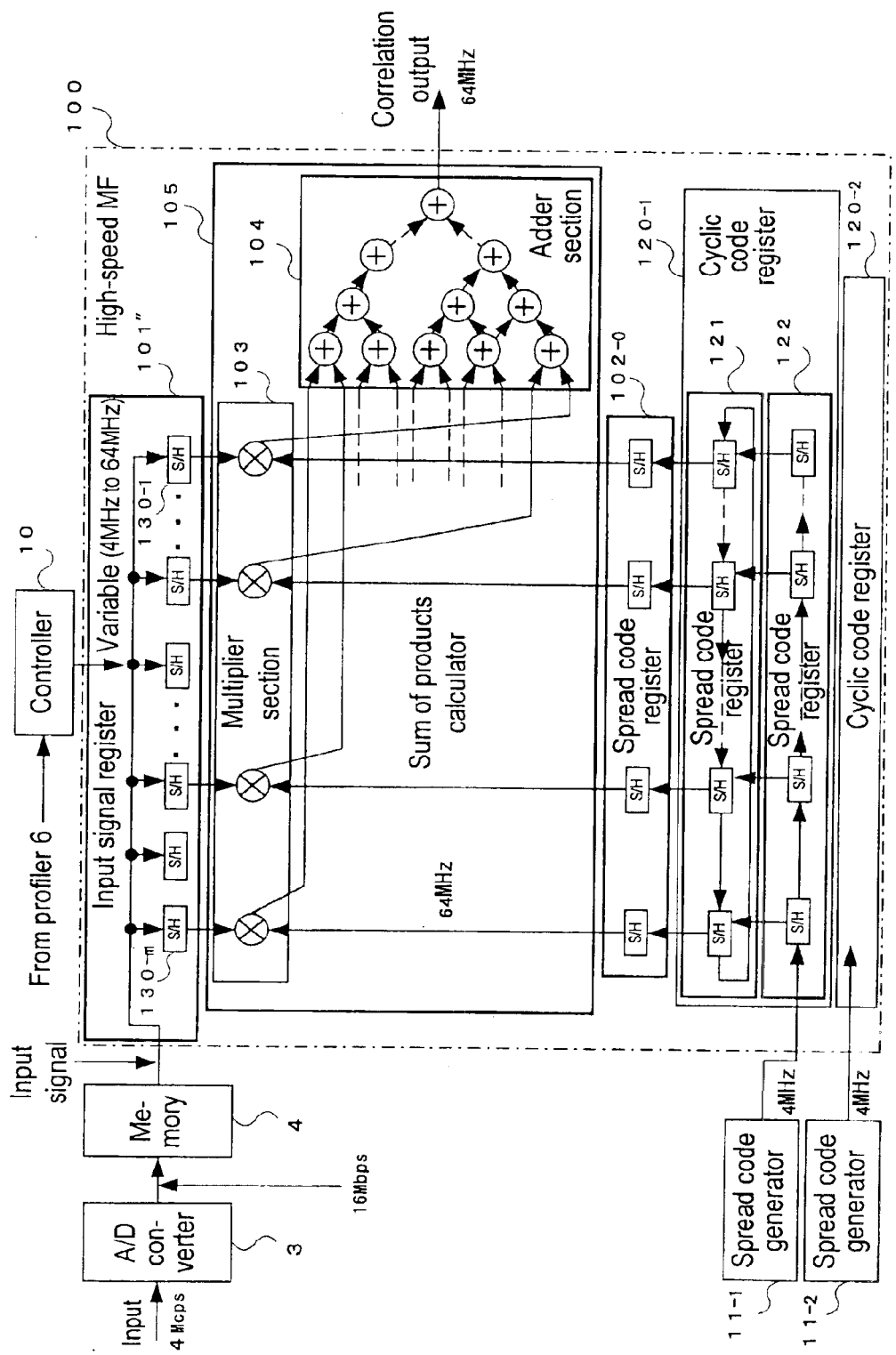
FIG. 6 is a constitution block diagram of the correlation circuit for spread spectrum communication according to a second embodiment of the present invention.

The correlation circuit for spread spectrum communication according to the second embodiment (a fourth correlation circuit for spread spectrum communication of the present invention) will next be described with reference to FIG. 6. FIG. 6 is a constitution block diagram of the correlation circuit for spread spectrum communication according to the second embodiment of the present invention. Additionally, the constitution part similar to that of FIG. 1 will be described with the same reference numerals.

Similarly as the first correlation circuit for spread spectrum communication as shown in FIG. 1, the fourth correlation circuit for spread spectrum communication of the present invention is constituted of the A/D converter 3, memory 4, high-speed matched filter 100, spread code generator 11, and controller 10.

The respective components of the fourth correlation circuit for spread spectrum communication of the present invention are basically similar to those of the first correlation circuit for spread spectrum communication, except the high-speed matched filter 100. Therefore, the description of the corresponding components is omitted.

The internal constitution of the high-speed matched filter 100 (fourth high-speed matched filter) for use in the fourth correlation circuit for spread spectrum communication of the present invention is constituted of the sum of products calculator 105 including the multiplier section 103 and adder section 104, and the spread code register 102, similarly as the first high-speed matched filter shown in FIG. 1. Additionally, the fourth high-speed matched filter comprises an input signal register 101", and a plurality of cyclic code registers 120 as characteristic components.

The input signal register 101" of the fourth high-speed matched filter is constituted of a plurality of (generally, spread ratio×over-sampling number) S/H circuits 130. Under the control of the controller 10, each one piece of data from the memory 4 is stored into an S/H circuits 130-1, 130-2, . . . , 130-m in order, and next returned to the S/H circuit 130-1. The data is cyclically stored.

Moreover, in the input signal register 101" of the fourth high-speed matched filter 100, the data is updated for each sampling clock in the standard manner, but the storage speed of the new data for the update into the input signal register (data transfer speed) is set to be variable in accordance with the detected number of users having the superposed phases by the controller 10.

The cyclic code register 120 of the fourth high-speed matched filter is a register for outputting the spread code to the spread code register 102 in accordance with the symbol start position in the input signal register 101", and is constituted of a cyclic code register for calculation 121 and a load waiting code shift register 122.

The load waiting code shift register 122 shifts and holds the spread code outputted from the spread code generator 11, and waits for one spread code to be outputted (loaded) to the cyclic code register for calculation 121 in response to an instruction.

The cyclic code register for calculation 121 rotates the spread code loaded from the load waiting code shift register 122 following the control from the controller 10, and outputs the code to the spread code register 102 in accordance with the start position of the symbol in the input signal register 101".

Moreover, the controller 10 of the fourth correlation circuit for spread spectrum communication usually controls the input data stored in the memory 4 to be stored in the S/H circuit 130 of the input signal register 101" in order for each sample clock. The controller further rotates the cyclic code register for calculation 121 of the load waiting code shift register 122 in accordance with the symbol start position, and allows the sum of products calculator 105 to calculate the sum of products via the spread code register 102.

Furthermore, the controller detects the number of users having the superposed phases from the phase information of the path detected by the profiler 6. When the number of users having the superposed phases is more than the number of users (number of spread codes) able to be processed with the same phase in the standard manner, the new data storage speed (data transfer speed) to the input signal register is lowered/slowed. Subsequently, in order to cancel the influences of the reduced data transfer speed, the storage speed of the new data (data transfer speed) to the input signal register is controlled and raised in the situation in which the number of users having the superposed phases is less than the number of users (number of spread codes) processable with the same phase in the standard manner.

In an operation of the fourth correlation circuit for spread spectrum communication of the present invention, the received signal stored in the memory 4 is read from the memory 4 at the standard transfer speed of 16 MHz, and stored in order from the S/H circuit 130-1 of the input signal register 101" of the high-speed matched filter 100. When the received signal is stored in the S/H circuit 130-m, the spread code from the spread code generator 11 is also successively shifted and stored in the load waiting code shift register 122, and loaded in the cyclic code register for calculation 121.

At this time, the data held in the input signal register 101", and the spread code outputted from the cyclic code register for calculation 121 via the spread code register 102 are used to calculate the sum of product by the sum of products calculator 105, and the correlation value is outputted.

Subsequently, in the next sample timing, the new received data is read from the memory 4, and stored in the S/H circuit 130-1 of the input signal register 101" of the high-speed matched filter 100. The symbol turns to S/H circuits 130-2 to 130-m, and 130-1. One spread code is cyclically shifted in the cyclic code register for calculation 121 of another cyclic code register 120. The spread code outputted via the spread code register 102 and the data held by the input signal register 101" are used to calculate the sum of products by the sum of products calculator 105 and the correlation value is outputted.

Moreover, the controller 10 detects the number of users having the superposed phases from the phase information of the path detected by the profiler 6. When the number of users having the superposed phases is more than the number of users (number of spread codes) able to be processed with the same phase in the standard manner, the new data storage speed (data transfer speed) to the input signal register is lowered/slowed. After the sum of products is calculated for the number of users having the superposed phases, the next received signal is controlled to be stored in the S/H circuit 130 of the input signal register 101".

Additionally, FIG. 6 shows the example in which the technique of the second embodiment is applied to the correlation circuit for spread spectrum communication shown in FIG. 1, and the technique of the second embodiment can similarly be applied to FIGS. 3, 4, 5.

According to the correlation circuit for spread spectrum communication of the second embodiment of the present invention, rewriting of the data in the input signal register 101" is performed for each one S/H circuit. The symbol start position deviates, this deviation is adjusted by cyclically shifting the spread code in the cyclic code register 120, and the sum of products is calculated. When the number of users having the superposed phases is more than the number of users (number of spread codes) able to be processed with the same phase in the standard manner, the new data storage speed (data transfer speed) to the input signal register is lowered/slowed as compared with the speed of the sampling clock. After the sum of products is calculated for the number of users having the superposed phases, the next received signal is stored in the S/H circuit 130 of the input signal register 101". Therefore, even when the number of users having the superposed phases increases, the transfer speed to the input signal register 101 is set to be variable and controlled without enlarging the constitution of the high-speed matched filter section. Therefore, the power consumption is largely reduced, and the correlation output can efficiently be obtained.

In the aforementioned correlation circuit for spread spectrum communication of the first and second embodiments, the spread ratio is 256 at maximum, and the constitution can cope with the maximum spread ratio.

The spread ratio is in a range of 4 to 256 as defined in 3GPP specifications, and the sliding correlator (SC) can handle a difference of the spread ratio with the same hardware simply by changing the number of accumulating/addition operations.

The matched filter can handle the difference in two methods.

A simplest first method in the correlation circuit for spread spectrum communication shown in FIG. 1 is a countermeasure of setting an unnecessary portion (remaining 192 pieces of data with a spread ratio of 64) of the spread code register 102 substantially to zero, setting the signal from the input signal register 101 substantially to zero in the unnecessary portion and inputting the signal to the multiplier, or preventing the output from the unnecessary multiplier from entering the adder or setting the output to zero. In this case, the circuit constitution of FIG. 1 can be realized without any change. Additionally, there is only one place in which the correlation output is obtained.

The correlation circuit for spread spectrum communication for handing various spread ratios according to a third embodiment of the present invention will next be described.

The correlation circuit for spread spectrum communication according to a third embodiment of the present invention is realized by waiting for an addition result of a multiplier limited in accordance with the spread ratio and obtaining the correlation value in order to handle a plurality of different spread ratios, instead of adding all multiplication results of the respective multipliers and obtaining the correlation ratio.

Figure 7:
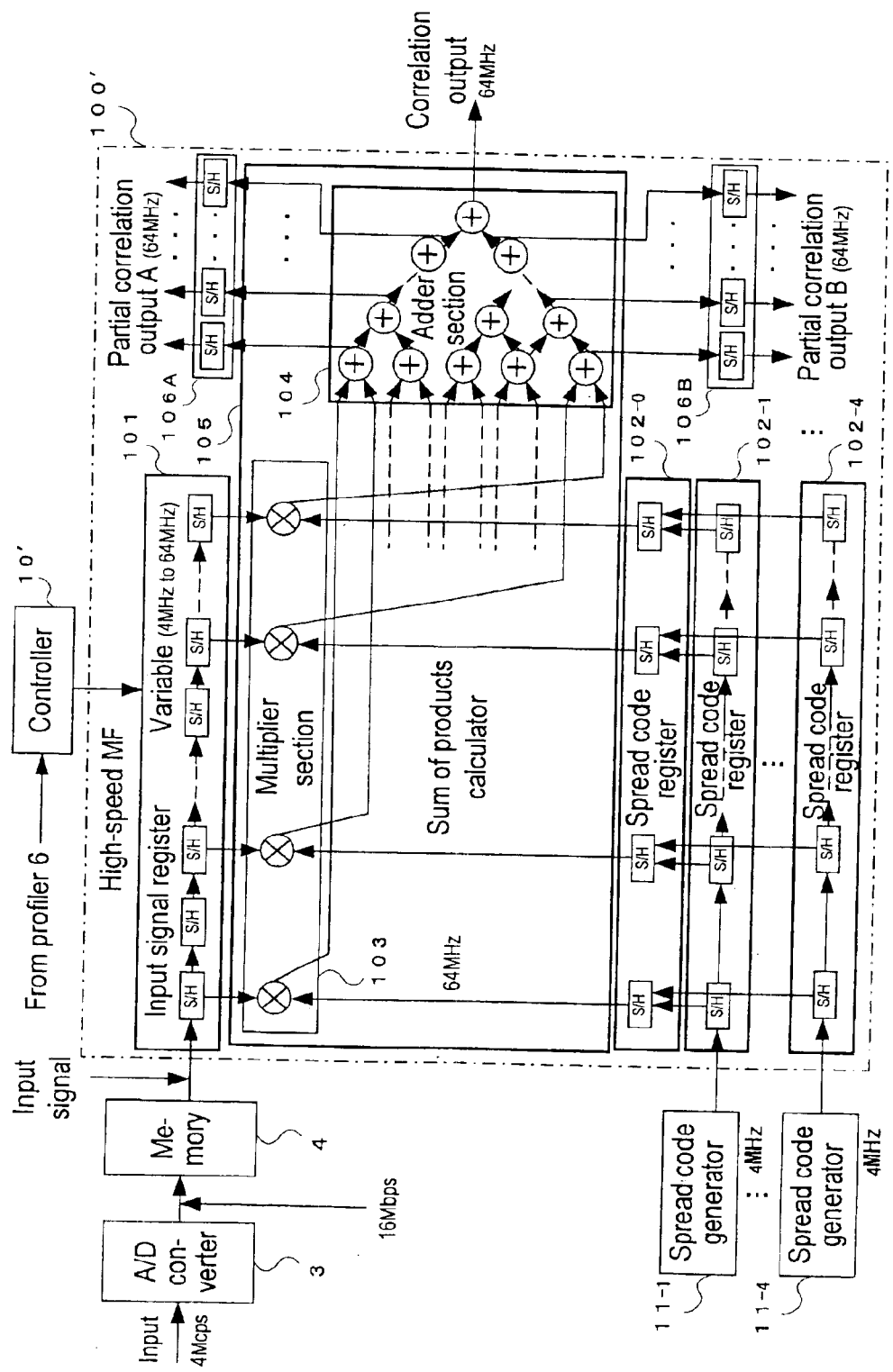
FIG. 7 is a block diagram showing a first constitution example of the correlation circuit for spread spectrum communication according to a third embodiment of the present invention.

A first constitution example (fifth correlation circuit for spread spectrum communication) of the correlation circuit for spread spectrum communication according to the third embodiment of the present invention will first be described with reference to FIG. 7. FIG. 7 is a block diagram showing the first constitution example of the correlation circuit for spread spectrum communication according to the third embodiment of the present invention. Additionally, the constitution part similar to that of FIG. 1 will be described with the same reference numerals.

The first constitution example (fifth correlation circuit for spread spectrum communication) of the correlation circuit for spread spectrum communication according to the third embodiment of the present invention is basically constituted of the A/D converter 3, memory 4, high-speed matched filter 100', spread code generator 11, and controller 10' similarly as FIG. 1.

The respective components of the fifth correlation circuit for spread spectrum communication of the present invention are basically similar to those of the first correlation circuit for spread spectrum communication, except the high-speed matched filter 100'. Therefore, the description of the corresponding components is omitted.

The internal constitution of the high-speed matched filter 100' (fifth high-speed matched filter) for use in the fifth correlation circuit for spread spectrum communication of the present invention is constituted of the input signal register 101, a plurality of spread code registers 102, and the sum of products calculator 105 including the multiplier section 103 and adder section 104 similarly as the first matched filter shown in FIG. 1. Additionally, the filter comprises a sum of products calculation output holder 106 for holding a partial correlation output which is obtained by extracting the output from a midway portion of the adders arranged in the form of stairs in the adder section 104.

Moreover, in addition to the function of the controller 10 of the first correlation circuit for spread spectrum communication, the controller 10' of the fifth correlation circuit for spread spectrum communication of the present invention performs a control whose correlation output is a correlation value held by any sum of products calculation output holder 106 in accordance with the spread ratio.

In the operation of the fifth correlation circuit for spread spectrum communication of the present invention, when the spread ratio is 256 at maximum, and the spread code is set to the spread code register 102, the data of the input signal register 101 and the spread code of the spread code register 102 are used to calculate the sum of products. The output from the last adder in the adder section 104 is obtained as the correlation output as usual.

Moreover, when the spread ratio is other than 256, for example, 128, and the spread code is set, for example, to right-half 128 S/H circuits of 256 S/H circuits of the spread code register 102, a result of calculation of a sum of products using right-half data of the input signal register 101 and right-half spread codes of the spread code register 102 is necessary. The output from the lower last but one adder in the adder section 104 may be obtained as the correlation output.

Similarly, when the spread ratio is, for example, 64, and the spread code is set, for example, to right ¼ 64 S/H circuits of the 256 S/H circuits of the spread code register 102, the result of calculation of the sum of products using right ¼ data of the input signal register 101 and right ¼ spread codes of the spread code register 102 is necessary. The output from the lowermost adder which is third from the last in the adder section 104 may be obtained as the correlation output.

Figure 8:
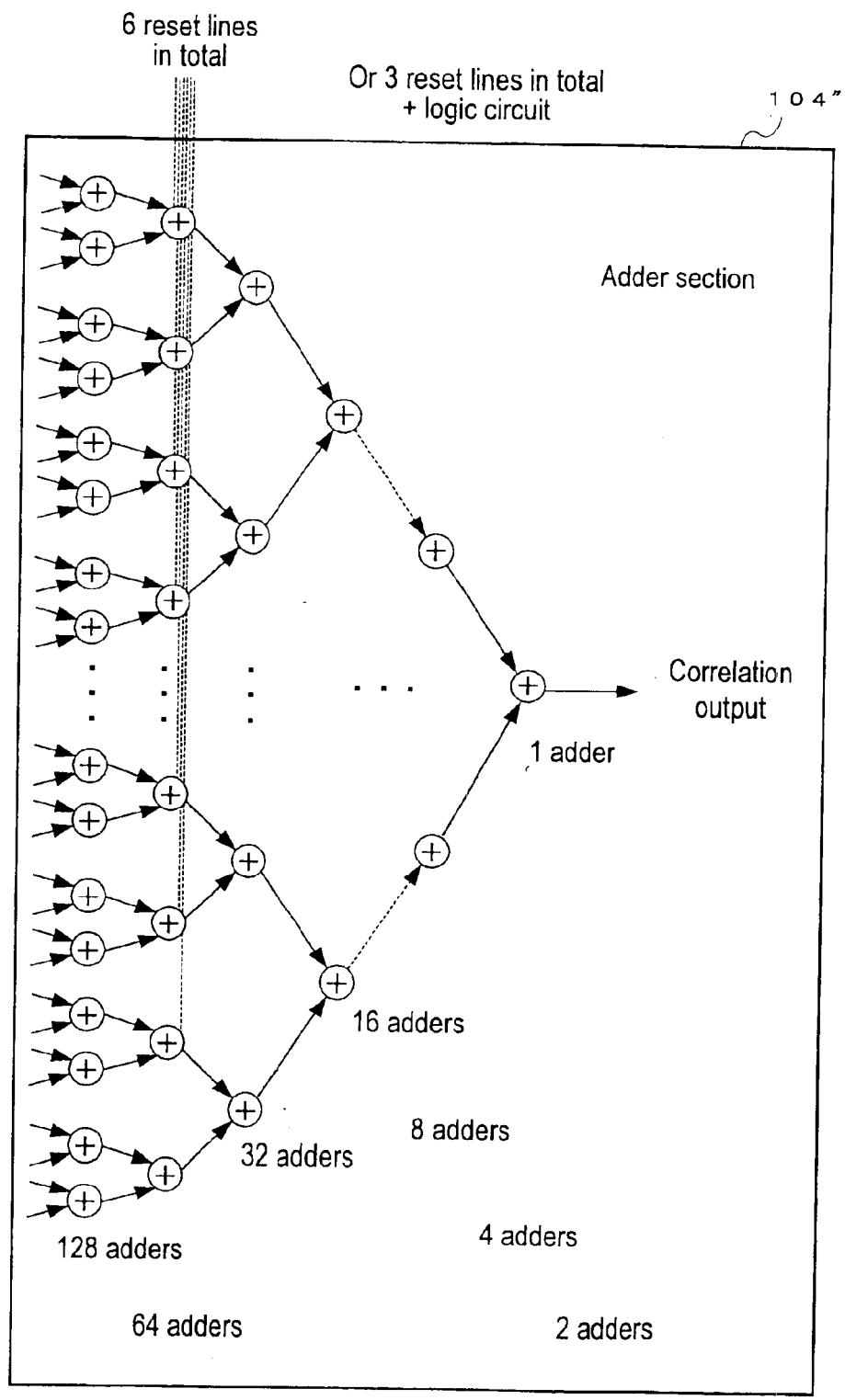
FIG. 8 is a block diagram showing another constitution example of an adder section 104 of a fifth correlation circuit for spread spectrum communication according to the third embodiment of the present invention.

In the correlation circuit for spread spectrum communication shown in FIG. 7, the output from the midway portion of the adders arranged in the form of stairs in the adder section 104 is stored in each S/H circuit of the sum of products calculation output holder 106, and the addition result stored in S/H corresponding to the spread ratio is employed as the correlation value. Another constitution example for resetting an unnecessary addition result in accordance with the spread ratio will be described with reference to FIG. 8. FIG. 8 is a block diagram showing another constitution example of the adder section 104 of the fifth correlation circuit for spread spectrum communication according to the third embodiment of the present invention.

As another constitution example of the adder section 104 of the fifth correlation circuit for spread spectrum communication, as shown in FIG. 8, the adders of a second stage has a reset function. In response to an instruction from the outside (controller 10') based on the spread ratio, the addition result of the adders of the unnecessary portion is reset, and the output from the adders of the last stage is constantly used as the correlation output.

For example, when the spread ratio is 128, and the spread code is set, for example, to the right-half 128 S/H circuits of 256 S/H circuits of the spread code register 102, the result of calculation of the sum of products using the right-half data of the input signal register 101 and the right-half spread codes of the spread code register 102 is necessary. Since the addition result in the upper-half adders in FIG. 8 is unnecessary, the upper-half adders are reset by a reset line, and the output from the adder of the last stage may be used as the correlation output.

Similarly, when the spread ratio is 64, and the spread code is set, for example, to the right ¼ 64 S/H circuits of the 256 S/H circuits of the spread code register 102, the result of calculation of the sum of products using the right ¼ data of the input signal register 101 and the right ¼ spread codes of the spread code register 102 is necessary. Since the addition result in the upper ¾ adders in FIG. 8 is unnecessary, the upper ¾ adders are reset by the reset line, and the output from the adder of the last stage may be used as the correlation output.

Figure 9:
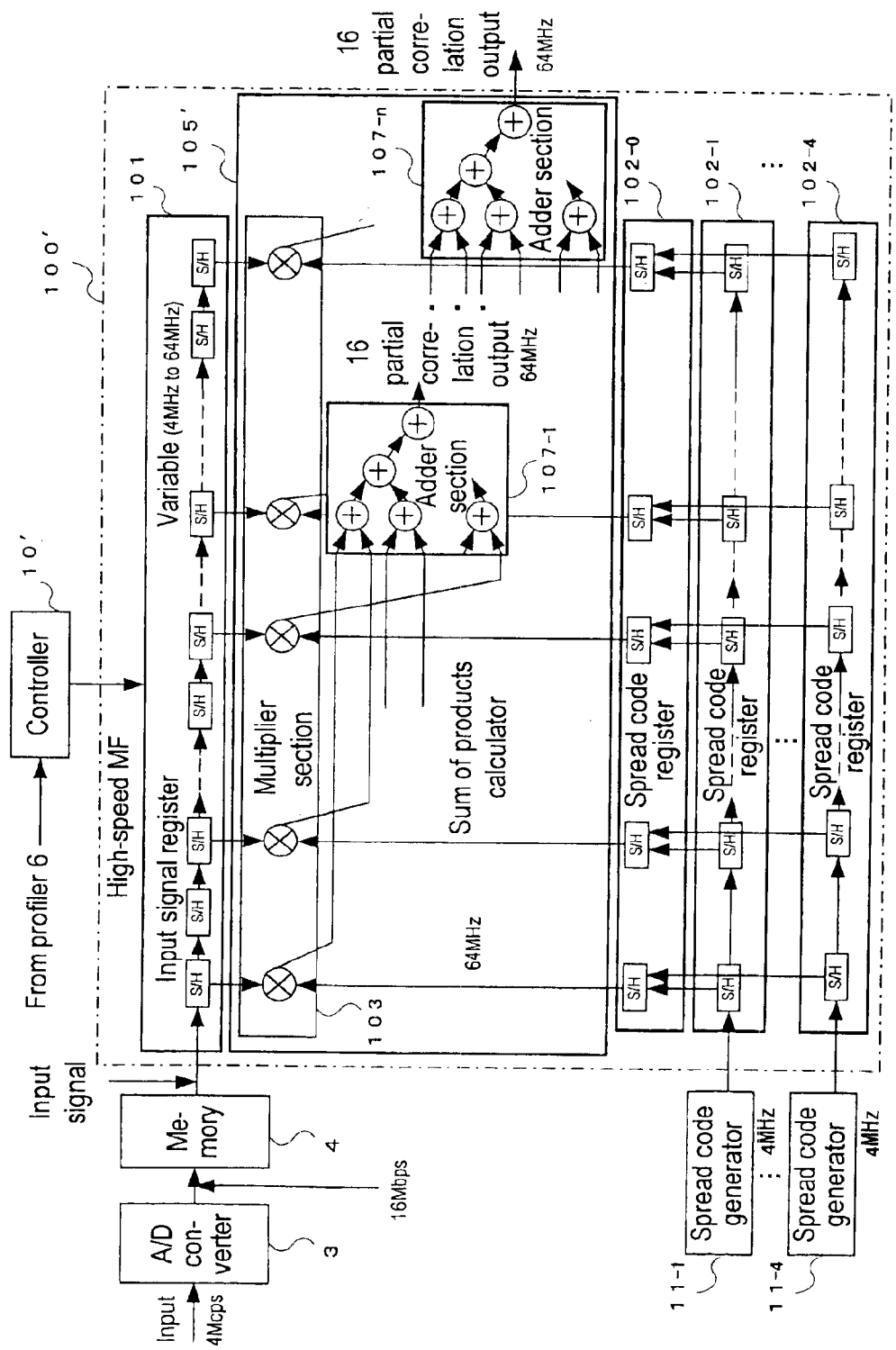
FIG. 9 is a block diagram showing a third constitution example of the correlation circuit for spread spectrum communication according to the third embodiment of the present invention.

Another constitution example (sixth correlation circuit for spread spectrum communication) of the correlation circuit for spread spectrum communication according to the third embodiment of the present invention will next be described with reference to FIG. 9. FIG. 9 is a block diagram showing the third constitution example of the correlation circuit for spread spectrum communication according to the third embodiment of the present invention. Additionally, the constitution part similar to that of FIG. 1 will be described with the same reference numerals.

The third constitution example (sixth correlation circuit for spread spectrum communication) of the correlation circuit for spread spectrum communication according to the third embodiment of the present invention is, as shown in FIG. 9, basically constituted of the A/D converter 3, memory 4, high-speed matched filter 100', spread code generator 11, and controller 10' similarly as FIG. 1.

The respective components of the sixth correlation circuit for spread spectrum communication of the present invention are similar to those of the first correlation circuit for spread spectrum communication, except the high-speed matched filter 100'. Therefore, the description of the corresponding components is omitted.

The internal constitution of the high-speed matched filter 100' (sixth high-speed matched filter) for use in the sixth correlation circuit for spread spectrum communication of the present invention is basically constituted of the input signal register 101, a plurality of spread code registers 102, and sum of products calculator 105' similarly as the first matched filter shown in FIG. 1.

Additionally, the internal constitution of the sum of products calculator 105' is constituted of: the multiplier section 103 including a plurality of (concretely, the number of maximum spread ratio) multipliers; a plurality of block adder sections 107 for adding every two outputs of the specified number of multiplier outputs in the form of stairs and outputting the partial correlation output; and an adder (not shown) for selectively adding the outputs from the plurality of block adder sections 107.

In the example shown in FIG. 9, in the high-speed matched filter 100' designed for the maximum spread ratio of 256, 16 block adder sections 107 for adding every two outputs of 16 multiplier outputs in the form of stairs are disposed (n=16).

Moreover, in addition to the function of the controller 10 of the first correlation circuit for spread spectrum communication, the controller 10' of the sixth correlation circuit for spread spectrum communication of the present invention performs a control such that the partial correlation output values outputted from the block adder sections 107 are selectively added in accordance with the spread ratio and the correlation output is obtained.

In an operation of the sixth correlation circuit for spread spectrum communication of the present invention, when the spread ratio is maximum, that is, 256, and the spread code is set to the spread code register 102, the data of the input signal register 101 and the spread code of the spread code register 102 are used to calculate the sum of products. All 16 partial correlation outputs outputted from the 16 block adder sections 107 are added and the correlation output is obtained.

Furthermore, when the spread ratio is other than 256, for example, 128, and the spread code is set, for example, to the right-half 128 S/H circuits of 256 S/H circuits of the spread code register 102, the calculation result of the sum of products using the right-half data of the input signal register 101 and the right-half spread codes of the spread code register 102 is necessary. The 16 partial correlation outputs outputted from the right-half eight block adder sections 107 are added and the correlation output is obtained.

Similarly, when the spread ratio is 16, and the spread code is set, for example, to the right 1/16 16 S/H circuits of 256 S/H circuits of the spread code register 102, the calculation result of the sum of products using the right 1/16 data of the input signal register 101 and the right 1/16 spread codes of the spread code register 102 is necessary. The 16 partial correlation outputs outputted from the rightmost block adder section 107 are added and the correlation output is obtained.

In the constitution of FIG. 9, if the spread ratio is smaller than 16, for example, 8 and 4, the unnecessary portion of the spread code register is set to 0. Then, the 16 partial correlation outputs outputted from the rightmost block adder section 107 are used as the whole correlation output without any problem.

Therefore, in FIG. 9, 16 partial correlation outputs by 16 multipliers are obtained. However, eight block adder sections 107 for outputting 32 partial correlation outputs, four block adder sections 107 for outputting 64 partial correlation outputs, or two block adder sections 107 for 128 partial correlation outputs may be disposed.

Moreover, when the correlation circuit for spread spectrum communication shown in FIG. 9 is applied, and the sum of products calculator 105' can operate at a higher speed, for example, the multiplier section 103 is constituted of 16 multipliers, and 16 multiplication results are added and 16 partial correlation outputs are obtained in a block adder section 107-1. In the constitution, every 16 pieces of each data of the input signal register 101 and spread code register 102 are switched and inputted. When the number of outputs corresponding to the spread ratio are added out of 16 partial correlation outputs, the final correlation output may be obtained.

Additionally, when the spread ratio is 128, two channels (users) having a spread ratio of 256 are substantially used, and the whole channel number decreases.

The spread code has a series system of a tree structure in accordance with the spread ratio. For example, the code with a spread ratio of 256 is generated simply by arranging two codes each having a spread ratio of 128. Therefore, when channels having spread ratios of 256 and 128 are simultaneously formed in the same series, the channels cannot be distinguished. (When separate systems of codes are used, the channels with spread ratios of 256 and 128 can be distinguished and can exist in a mixed manner.) For example, the user, which has heretofore been transmitted at 256, is to be transmitted at 128 in the same series. Then, the user is similar to another user with 128 transmitted at 256. Therefore, orthogonality cannot be kept and the user cannot communicate. In general, as a result, when the channel having a small spread ratio is used in high-speed data communication, the number of users (channels) able to be handled decreases.

Therefore, the increase of the channel (user) having a small spread ratio means a decrease of the channel to be demodulated, and an effect is exerted in a direction in which allowance in the correlation circuit for spread spectrum communication of the present invention is further increased.

Additionally, for the correlation circuit for spread spectrum communication according to the third embodiment of the present invention, in the constitution shown in FIG. 7 or 9, the users or the paths whose spread ratios (e.g., 128) are less than 256 in different code series are superposed with the same clock. In this case, a plurality of series of spread codes (two types of spread codes of 128) are generated from the same spread code generator 11. This provides a merit that different users can simultaneously be demodulated by the respective partial correlation outputs (two outputs with 128) by the calculation of the sum of products in the same timing.

Moreover, in the correlation circuit for spread spectrum communication of FIG. 7 or 9, when the spread ratio is 128 during demodulation, the same code having a spread ratio of 128 is generated twice from the spread code generator 11 and stored in the spread code register 102. While 1024 pieces of data are stored in the input signal register 101, the received data is collectively multiplied by the spread code by all the multipliers. The outputs from lower and upper adders which are second from the last in the adder section 104 are extracted as the respective correlation outputs, and two correlation (demodulation) operations can be performed once.

According to the aforementioned correlation circuit for spread spectrum communication of the present invention, schedule is set such that all demodulation processing and path search operation are performed within one symbol time. The controller 10 or 10' performs variable control of the transfer speed of the input signal to the input signal register 101, control of the previous-stage memory, changeover control of the spread code register, control of the multiplier, and control of the partial correlation output. Therefore, a work amount of the control circuit increases. However, when the circuit is realized by DSP, and the like, complicated control operation can also effectively be realized without increasing the constitution.

Moreover, in the above description, mainly the S/H having the F/F constitution is used as the input signal register 101. However, since the standard memory (SRAM, DRAM) can be used as shown in FIG. 5, hardware scale (occupancy area of LSI) can largely be reduced.

Furthermore, with increase of the operation speed of LSI in future, the processing amount of the sum of products calculator section can be increased substantially with the same hardware scale.

Additionally, when the correlation circuit for spread spectrum communication described above in detail is realized, and CDMA demodulation circuit can be constituted with the small gate scale, it is also possible to develop LSI for a mobile terminal in near future.

According to the present invention, when the users more than the specified number exist in the same phase of the input signal from the memory, the controller controls the transfer speed of the shift of one sample in the input signal register in order to hold a sufficient time for completing the calculation of the sum of products with all the plurality of users in the sum of products calculator. Subsequently, in order to compensate for delay time within one symbol, when the users less than the specified number exist in the same phase, the transfer speed is controlled to be higher than the specified speed. Moreover, under the control, the spread code to be outputted to the sum of products calculator is selected in accordance with the number of users of the same phase. In this correlation circuit for spread spectrum communication, many users having the superposed phases can effectively be demodulated without enlarging the circuit constitution.

According to the present invention, the correlation circuit for spread spectrum communication includes a plurality of A/D converters, memory, input signal register, and selector section for selecting the output from the plurality of input signal registers. The sum of products calculator multiplies and adds the input signal selected by the selector section and the spread code outputted from the spread code register at a specified number of times the sampling speed. Therefore, even with a plurality of input signals, many users having the superposed phases can effectively be demodulated without enlarging the circuit constitution.

According to the present invention, the controller controls the shift timing in each input signal register to deviate. Instead of the selector section, there is provided the register for holding the input signal outputted from the input signal register at the different timing. The sum of products calculator multiplies and adds the input signal held by the register and the spread code outputted from the spread code register at the specified number of times the sampling speed. The correlation circuit for spread spectrum communication can effectively be realized by the register constitution instead of the selector section.

According to the present invention, the controller controls the timing for outputting the input signal stored in the memory for the input signals and the spread code stored in the corresponding memory for the spread codes to the sum of products calculator. When the users more than the specified number exist in the same phase of the input signal inputted to the memory for the input signals, the controller controls the speed of the output timing from the input signal memory in order to hold the sufficient time for completing the calculation of the sum of products with all the plurality of users in the sum of products calculator. Subsequently, in order to compensate for the delay time within one symbol, when the users less than the specified number exist in the same phase, the speed of the output timing from the input signal memory is controlled to be higher than the specified speed. Moreover, under the control, the spread code to be outputted to the sum of products calculator is selected in accordance with the number of users of the same phase. In this correlation circuit for spread spectrum communication, many users having the superposed phases can effectively be demodulated without enlarging the circuit constitution.

According to the present invention, in the correlation circuit for spread spectrum communication, the sum of products calculator includes the multiplier section constituted of a plurality of multipliers for multiplying the input signal and spread code, and the plurality of block adder sections for obtaining the added partial correlation outputs by the unit of the specified number of multipliers in the multiplier section. The controller selects the partial correlation output from the block adder section in accordance with the spread ratio of the spread code. When there are a plurality of selected partial correlation outputs, the selected partial correlation outputs are added, and even the different spread ratio can be handled.

According to the present invention, the input signal register has a variable writing speed of the data, and successively writes and outputs the input signal from the memory at the specified speed. The spread code registers are prepared for the necessary number of users. The generated spread code is cyclically shifted and outputted. The controller controls the cyclic shift in the spread code register in accordance with the writing position in the input signal register. In the correlation circuit for spread spectrum communication, the input signal is not shifted by the input signal register. The power consumption in the circuit can effectively be suppressed by cyclically shifting the spread code.

According to the present invention, the sum of products calculator includes the multiplier section for multiplying the input signal and spread code, and the adder section for successively adding the multiplication result in the stepwise manner. The plurality of outputs in the course of the stepwise addition in the adder section can be selectively outputted as the partial correlation output, and the controller selects the partial correlation output in the adder section in accordance with the spread ratio of the spread code. The correlation circuit for spread spectrum communication can effectively handle even different spread ratios.

According to the present invention, there is provided the correlation circuit for spread spectrum communication wherein the sum of products calculator includes the multiplier section for multiplying the input signal and spread code, and the adder section for successively adding the multiplication result in the stepwise manner, and the controller resets the adder for performing the stepwise addition in the adder section in accordance with the spread ratio of the spread code. Therefore, even the different ratios can be handled.

According to the present invention, the sum of products calculator includes the multiplier section constituted of the plurality of multipliers for multiplying the input signal and spread code, and a plurality of block adder sections for outputting the added partial correlation outputs by the unit of the specified number of multipliers in the multiplier section. The controller selects the partial correlation output from the block adder section in accordance with the spread ratio of the spread code. When there are a plurality of partial correlation outputs, the selected partial correlation outputs are added. Therefore, the correlation circuit for spread spectrum communication can effectively handle even the different spread ratio.

What is claimed is:

1. A correlation circuit for spread spectrum communication for obtaining a correlation output from a spectrum-spread received signal, said circuit comprising:
an A/D converter for converting said received signal to a digital signal from an analog signal and sampling the signal;
a memory for storing an output from said A/D converter;
an input signal register, having a variable transfer speed of a shift, for shifting and outputting the input signal from said memory at a specified speed;

spread code registers, prepared for a necessary number of users, for shifting and outputting a generated spread code;

a sum of products calculator for multiplying and adding the input signal outputted from said input signal register and the spread code outputted from said spread code register at a specified number of times said sampling speed; and a controller for: controlling the transfer speed of the shift of one sample in said input signal register in order to hold a sufficient time for completing calculation of a sum of products with respect to all a plurality of users in said sum of products calculator, when the plurality of users more than a specified number of users exist in the same phase of the input signal from said memory; subsequently controlling and setting said transfer speed to be higher than said specified speed before compensating for a delay time within one symbol, when the users less than said specified number of users exist in the same phase; and controlling and selecting the spread code to be outputted to said sum of products calculator in accordance with the number of users in the same phase.

2. The correlation circuit for spread spectrum communication according to claim 1, comprising: a plurality of A/D converters for a plurality of input signals;

a plurality of memories for said plurality of A/D converters;

a plurality of input signal registers for said plurality of memories, and a selector section for selecting the output from said plurality of input signal registers, wherein the sum of products calculator multiplies and adds the input signal selected by said selector section and the spread code outputted from the spread code register at the specified number of times the sampling speed.

3. The correlation circuit for spread spectrum communication according to claim 2 wherein the controller controls a shift timing in each input signal register to deviate, a register for holding the input signals outputted from said input signal register at different timings is disposed instead of the selector section, and the sum of products calculator multiplies and adds the input signal held by the register and the spread code outputted from the spread code register at the specified number of times the sampling speed.

4. The correlation circuit for spread spectrum communication according to claim 1 wherein the input signal register has a variable writing speed of data, and successively writes and outputs the input signal from the memory at the specified speed, the spread code register is prepared for the necessary number of users, and cyclically shifts and outputs the generated spread code, and the controller controls a cyclic shift in said spread code register in accordance with a writing position in the input signal register.

5. The correlation circuit for spread spectrum communication according to claim 2 wherein the input signal register has a variable writing speed of data, and successively writes and outputs the input signal from the memory at the specified speed, the spread code register is prepared for the necessary number of users, and cyclically shifts and outputs the generated spread code, and the controller controls a cyclic shift in said spread code register in accordance with a writing position in the input signal register.

6. The correlation circuit for spread spectrum communication according to claim 3 wherein the input signal register has a variable writing speed of data, and successively writes and outputs the input signal from the memory at the specified speed, the spread code register is prepared for the necessary number of users, and cyclically shifts and outputs the generated spread code, and the controller controls a cyclic shift in said spread code register in accordance with a writing position in the input signal register.

7. The correlation circuit for spread spectrum communication according to claim 1 wherein the sum of products calculator comprises a multiplier section for multiplying the input signal and the spread code, and an adder section for successively adding a multiplication result in a stepwise manner, a plurality of outputs in the course of stepwise addition in said adder section can be selectively outputted as partial correlation outputs, and the controller selects the partial correlation output in said adder section in accordance with a spread ratio of said spread code.

8. The correlation circuit for spread spectrum communication according to claim 2 wherein the sum of products calculator comprises a multiplier section for multiplying the input signal and the spread code, and an adder section for successively adding a multiplication result in a stepwise manner, a plurality of outputs in the course of stepwise addition in said adder section can be selectively outputted as partial correlation outputs, and the controller selects the partial correlation output in said adder section in accordance with a spread ratio of said spread code.

9. The correlation circuit for spread spectrum communication according to claim 3 wherein the sum of products calculator comprises a multiplier section for multiplying the input signal and the spread code, and an adder section for successively adding a multiplication result in a stepwise manner, a plurality of outputs in the course of stepwise addition in said adder section can be selectively outputted as partial correlation outputs, and the controller selects the partial correlation output in said adder section in accordance with a spread ratio of said spread code.

10. The correlation circuit for spread spectrum communication according to claim 1 wherein the sum of products calculator comprises a multiplier section for multiplying the input signal and the spread code, and an adder section for successively adding a multiplication result in a stepwise manner, and the controller resets an adder for performing stepwise addition in the adder section in accordance with the spread ratio of the spread code.

11. The correlation circuit for spread spectrum communication according to claim 2 wherein the sum of products calculator comprises a multiplier section for multiplying the input signal and the spread code, and an adder section for successively adding a multiplication result in a stepwise manner, and the controller resets an adder for performing stepwise addition in the adder section in accordance with the spread ratio of the spread code.

12. The correlation circuit for spread spectrum communication according to claim 3 wherein the sum of products calculator comprises a multiplier section for multiplying the input signal and the spread code, and an adder section for successively adding a multiplication result in a stepwise manner, and the controller resets an adder for performing stepwise addition in the adder section in accordance with the spread ratio of the spread code.

13. The correlation circuit for spread spectrum communication according to claim 1 wherein the sum of products calculator comprises a multiplier section constituted of a plurality of multipliers for multiplying the input signal and the spread code, and a plurality of block adder sections for outputting partial correlation outputs added by a unit of a specified number of multipliers in said multiplier section, and the controller selects the partial correlation output from said block adder section in accordance with the spread ratio of said spread code, and adds said selected partial correlation outputs when there are a plurality of selected partial correlation outputs.

14. The correlation circuit for spread spectrum communication according to claim 2 wherein the sum of products calculator comprises a multiplier section constituted of a plurality of multipliers for multiplying the input signal and the spread code, and a plurality of block adder sections for outputting partial correlation outputs added by a unit of a specified number of multipliers in said multiplier section, and the controller selects the partial correlation output from said block adder section in accordance with the spread ratio of said spread code, and adds said selected partial correlation outputs when there are a plurality of selected partial correlation outputs.

15. The correlation circuit for spread spectrum communication according to claim 3 wherein the sum of products calculator comprises a multiplier section constituted of a plurality of multipliers for multiplying the input signal and the spread code, and a plurality of block adder sections for outputting partial correlation outputs added by a unit of a specified number of multipliers in said multiplier section, and the controller selects the partial correlation output from said block adder section in accordance with the spread ratio of said spread code, and adds said selected partial correlation outputs when there are a plurality of selected partial correlation outputs.

16. A correlation circuit for spread spectrum communication for obtaining a correlation output from a plurality of spectrum-spread received signals said circuit comprising:

a plurality of A/D converters for converting said plurality of received signals to digital signals from analog signals and sampling the signals;

a memory for input signals in which a speed of an output timing is variable and which stores outputs from said plurality of A/D converters and outputs the selected input signal at the speed of a specified timing;

a memory for spread codes which stores a plurality of types of spread codes and outputs the selected spread code;

a sum of products calculator for multiplying and adding the input signal selectively outputted from said memory for the input signals and the spread code selectively outputted from the memory for the spread codes at a specified number of times a sampling speed; and a controller for: controlling a timing for outputting the input signal stored in said memory for the input signals and the spread code stored in said corresponding memory for the spread codes to said sum of products calculator; controlling the speed of the output timing from said memory for the input signals in order to hold a sufficient time for completing calculation of a sum of products with respect to all a plurality of users in said sum of products calculator, when the plurality of users more than said specified number of users exist in the same phase of the input signal inputted in said memory for the input signals; subsequently controlling and setting the speed of the output timing from said memory for the input signals to be higher than the speed of said specified timing before compensating for a delay time within one symbol, when the users less than said specified number of users exist in the same phase; and controlling and selecting the spread code to be outputted to said sum of products calculator in accordance with the number of users in the same phase.

17. The correlation circuit for spread spectrum communication according to claim 16 wherein the sum of products calculator comprises a multiplier section for multiplying the input signal and the spread code, and an adder section for successively adding a multiplication result in a stepwise manner, a plurality of outputs in the course of stepwise addition in said adder section can be selectively outputted as partial correlation outputs, and the controller selects the partial correlation output in said adder section in accordance with a spread ratio of said spread code.

18. The correlation circuit for spread spectrum communication according to claim 16 wherein the sum of products calculator comprises a multiplier section for multiplying the input signal and the spread code, and an adder section for successively adding a multiplication result in a stepwise manner, and the controller resets an adder for performing stepwise addition in the adder section in accordance with the spread ratio of the spread code.

19. The correlation circuit for spread spectrum communication according to claim 16 wherein the sum of products calculator comprises a multiplier section constituted of a plurality of multipliers for multiplying the input signal and the spread code, and a plurality of block adder sections for outputting partial correlation outputs added by a unit of a specified number of multipliers in said multiplier section, and the controller selects the partial correlation output from said block adder section in accordance with the spread ratio of said spread code, and adds said selected partial correlation outputs when there are a plurality of selected partial correlation outputs.

* * * * *